United States Patent
Leuenberger et al.

(10) Patent No.: US 10,890,683 B2
(45) Date of Patent: Jan. 12, 2021

(54) WELLSITE SENSOR ASSEMBLY AND METHOD OF USING SAME

(71) Applicant: National Oilwell DHT, L.P., Houston, TX (US)

(72) Inventors: Gregory Edward Leuenberger, Spring, TX (US); Aaron E. Schen, Woodlands, TX (US); Jeries Abujries, Spring, TX (US); Kevin W. Clark, Montgomery, TX (US); Brandon Epperson, Magnolia, TX (US); Robert Warner, Conroe, TX (US); Jacob Riddel, Humble, TX (US); Brian McCarthy, Houston, TX (US); Alamzeb Hafeez Khan, Montgomery, TX (US)

(73) Assignee: National Oilwell DHT, L.P., Conroe, TX (US)

( * ) Notice: Subject to any disclaimer, the term of this patent is extended or adjusted under 35 U.S.C. 154(b) by 52 days.

(21) Appl. No.: 15/788,889

(22) Filed: Oct. 20, 2017

(65) Prior Publication Data

US 2018/0052131 A1      Feb. 22, 2018

Related U.S. Application Data

(63) Continuation of application No. 15/567,851, filed as application No. PCT/US2016/028525 on Apr. 20, 2016.
(Continued)

(51) Int. Cl.
*G01V 1/52*      (2006.01)
*E21B 12/02*      (2006.01)
(Continued)

(52) U.S. Cl.
CPC ............... *G01V 1/52* (2013.01); *E21B 12/02* (2013.01); *E21B 47/09* (2013.01); *G01N 27/205* (2013.01); *G01V 1/46* (2013.01)

(58) Field of Classification Search
CPC ....... G06F 1/00; G06F 2101/00; H01L 21/00; H01L 2221/00
See application file for complete search history.

(56) References Cited

U.S. PATENT DOCUMENTS 6,173,793 B1 * 1/2001 Thompson .............. E21B 47/01
                                                  175/24
6,279,670 B1    8/2001 Eddison et al.
(Continued)

FOREIGN PATENT DOCUMENTS

GB      2425607 A    1/2006
WO    2012/011918 A1    1/2012

OTHER PUBLICATIONS

International Patent Application No. PCT/US2016/028525 International Search Report and Written Opinion dated Sep. 7, 2016 (10 pages).
(Continued)

*Primary Examiner* — Jermele M Hollington
*Assistant Examiner* — Temilade S Rhodes-Vivour
(74) *Attorney, Agent, or Firm* — Conley Rose, P.C.

(57) ABSTRACT

A sensor assembly for a downhole tool including a tool body and a movable component movably positionable about the tool body is disclosed. The sensor assembly may include a wear sensor and/or a position sensor. The wear sensor may include a core with conductors at various depths to send a signal, whereby, upon wear of the core, a change in the signal at the depth of the wear is detectable. The position sensor may be carried by the movable component, and may be used with references comprising magnets distributed about the tool body. The position sensor includes magnets
(Continued)

having polarity responsive to polarity of the references whereby a position of the movable component is determined. The sensor assembly may also include a chassis housing electronics coupled to the position sensor and/or the wear sensor.

20 Claims, 22 Drawing Sheets

Related U.S. Application Data

(60) Provisional application No. 62/150,217, filed on Apr. 20, 2015.

(51) Int. Cl.
*E21B 47/09* (2012.01)
*G01V 1/46* (2006.01)
*G01N 27/20* (2006.01)

(56) References Cited

U.S. PATENT DOCUMENTS

| | | | |
|---|---|---|---|
| 6,615,933 B1 | 9/2003 | Eddison | |
| 7,271,349 B2 | 9/2007 | Jessep et al. | |
| 7,703,553 B2 | 4/2010 | Eddison et al. | |
| 7,823,663 B2 | 11/2010 | Eddison | |
| 7,958,953 B2 | 6/2011 | Chafai | |
| 8,307,921 B2 | 11/2012 | Eddison | |
| 9,243,381 B2 * | 1/2016 | Behmlander | G01N 29/07 |
| 9,316,278 B2 * | 4/2016 | Moore | F16D 66/022 |
| 9,592,866 B2 * | 3/2017 | Hasselbusch | B62D 55/20 |
| 9,670,649 B2 * | 6/2017 | Bewley | E02F 9/2833 |
| 2005/0115741 A1 * | 6/2005 | Terry | G01V 3/30 |
| | | | 175/61 |
| 2005/0230149 A1 | 10/2005 | Boucher et al. | |
| 2005/0287386 A1 * | 12/2005 | Sabol | F01D 17/02 |
| | | | 428/543 |
| 2009/0173493 A1 * | 7/2009 | Hutin | E21B 17/003 |
| | | | 166/250.01 |
| 2009/0266609 A1 | 10/2009 | Hall et al. | |
| 2010/0068508 A1 * | 3/2010 | Shinde | G01N 3/56 |
| | | | 428/332 |
| 2010/0117859 A1 | 5/2010 | Mitchell et al. | |
| 2010/0139987 A1 | 6/2010 | Hunt et al. | |
| 2010/0181115 A1 | 7/2010 | Eddison | |
| 2012/0043980 A1 | 2/2012 | Davies | |
| 2012/0055714 A1 | 3/2012 | Adam | |
| 2012/0325564 A1 | 12/2012 | Vaughn et al. | |
| 2013/0299284 A1 * | 11/2013 | Lange | F16D 66/027 |
| | | | 188/1.11 L |
| 2014/0365069 A1 * | 12/2014 | Orlewski | G01M 17/02 |
| | | | 701/32.7 |
| 2015/0126834 A1 * | 5/2015 | Wang | B32B 38/145 |
| | | | 600/345 |

OTHER PUBLICATIONS

European Patent Application No. 17198932.0 Extended European Search Report dated Mar. 12, 2018 (8 pages).
European Patent Application No. 16783807.7 Extended European Search Report dated Nov. 29, 2018 (7 pages).

* cited by examiner

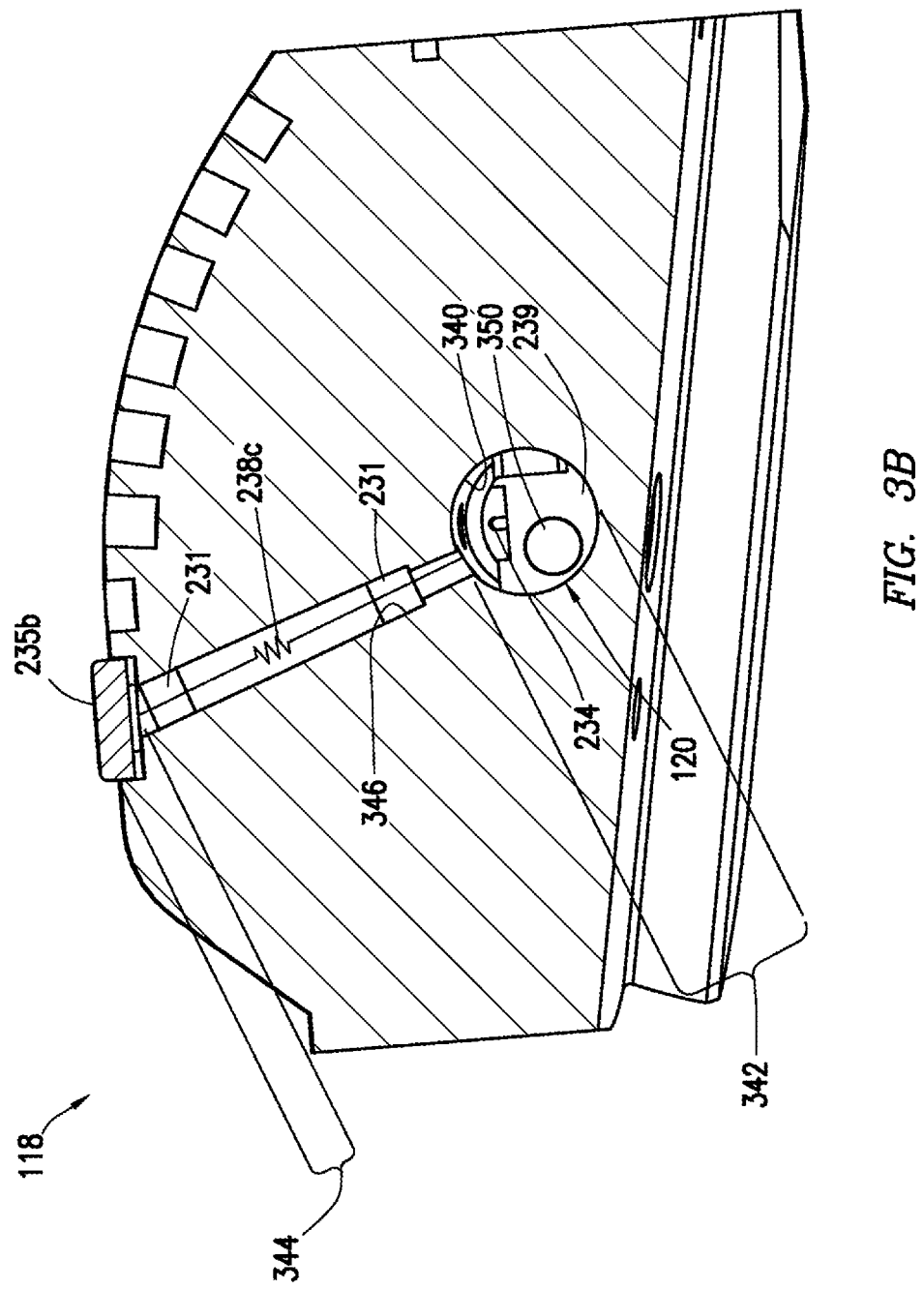

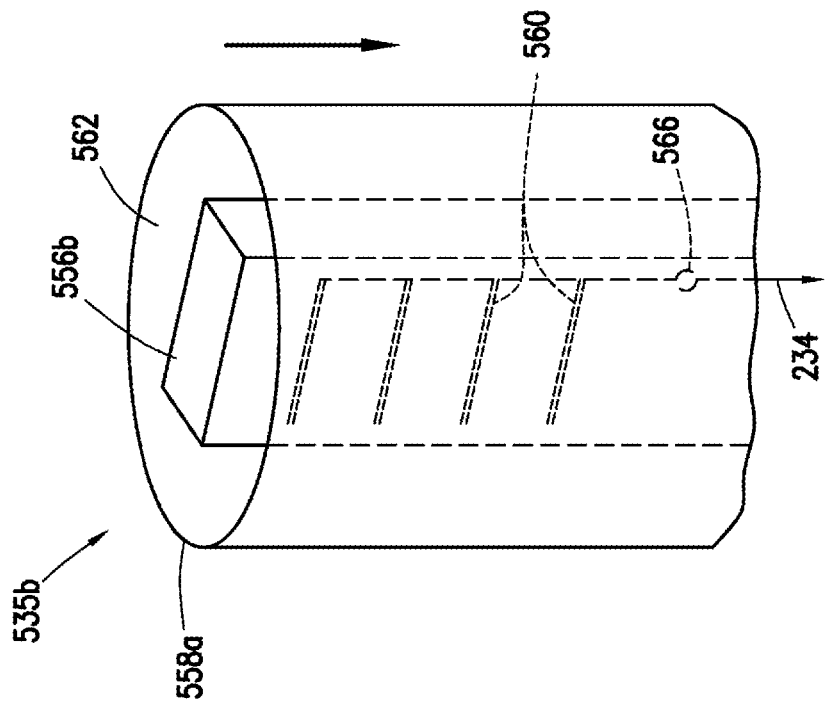
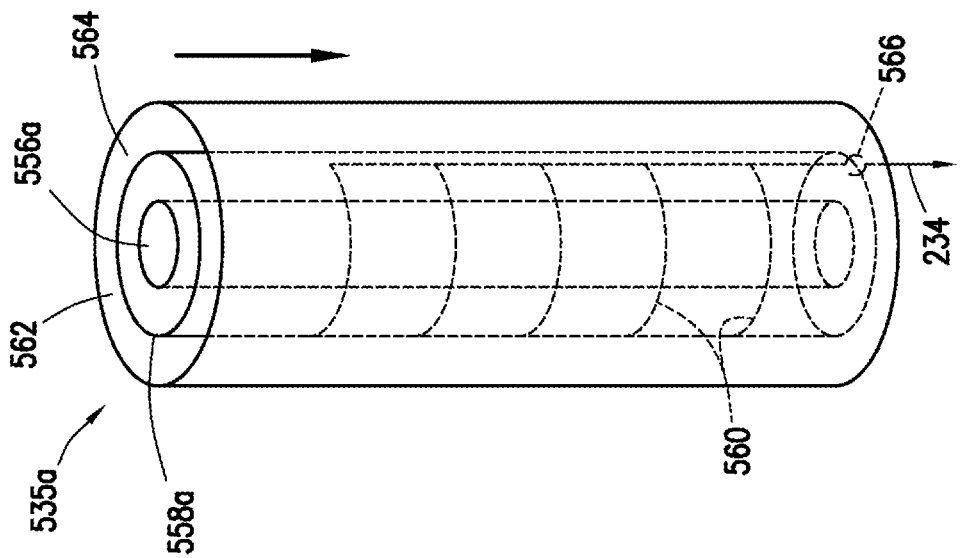
FIG. 5B
FIG. 5A

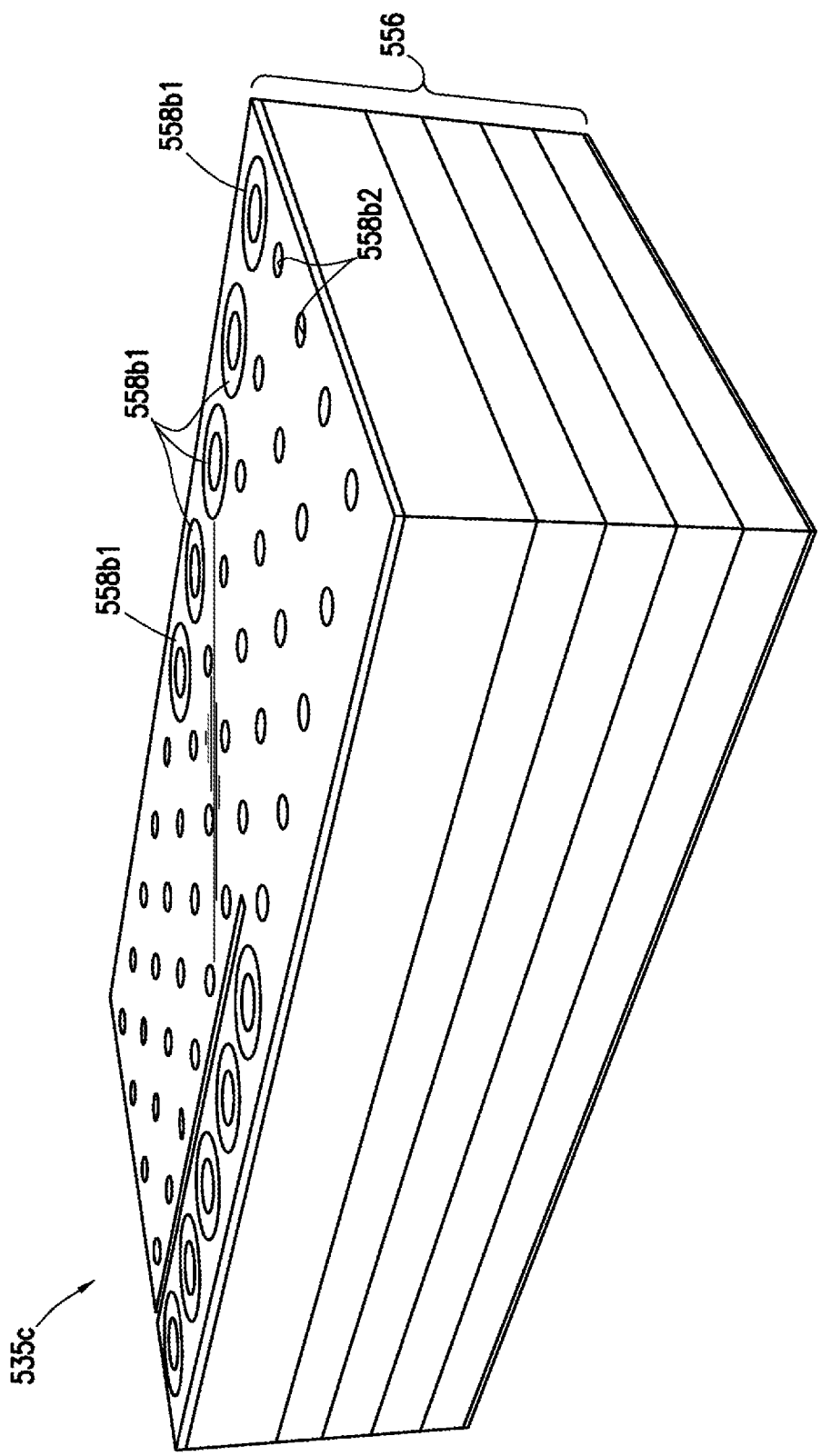
FIG. 5C1

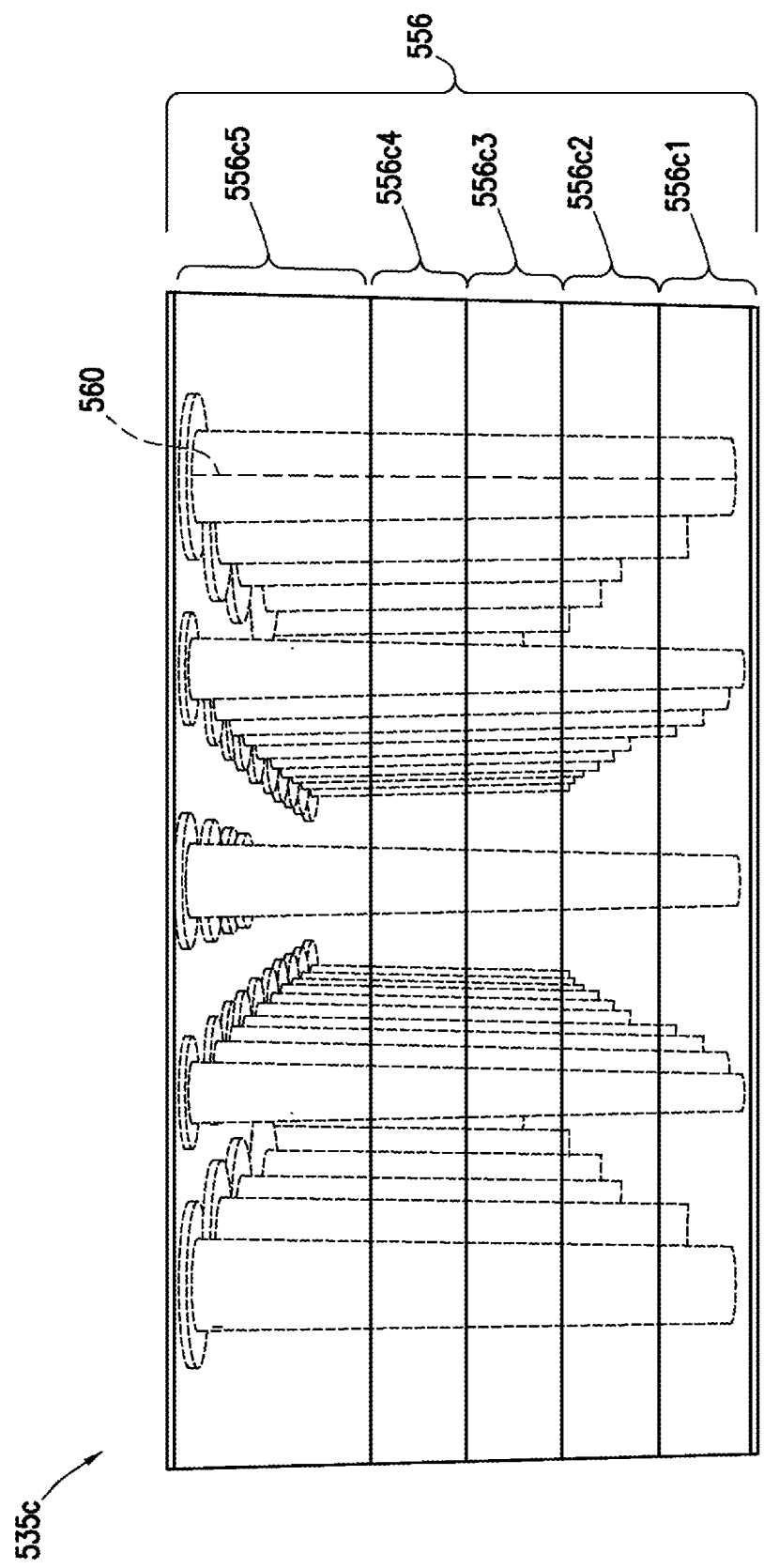
FIG. 5C2

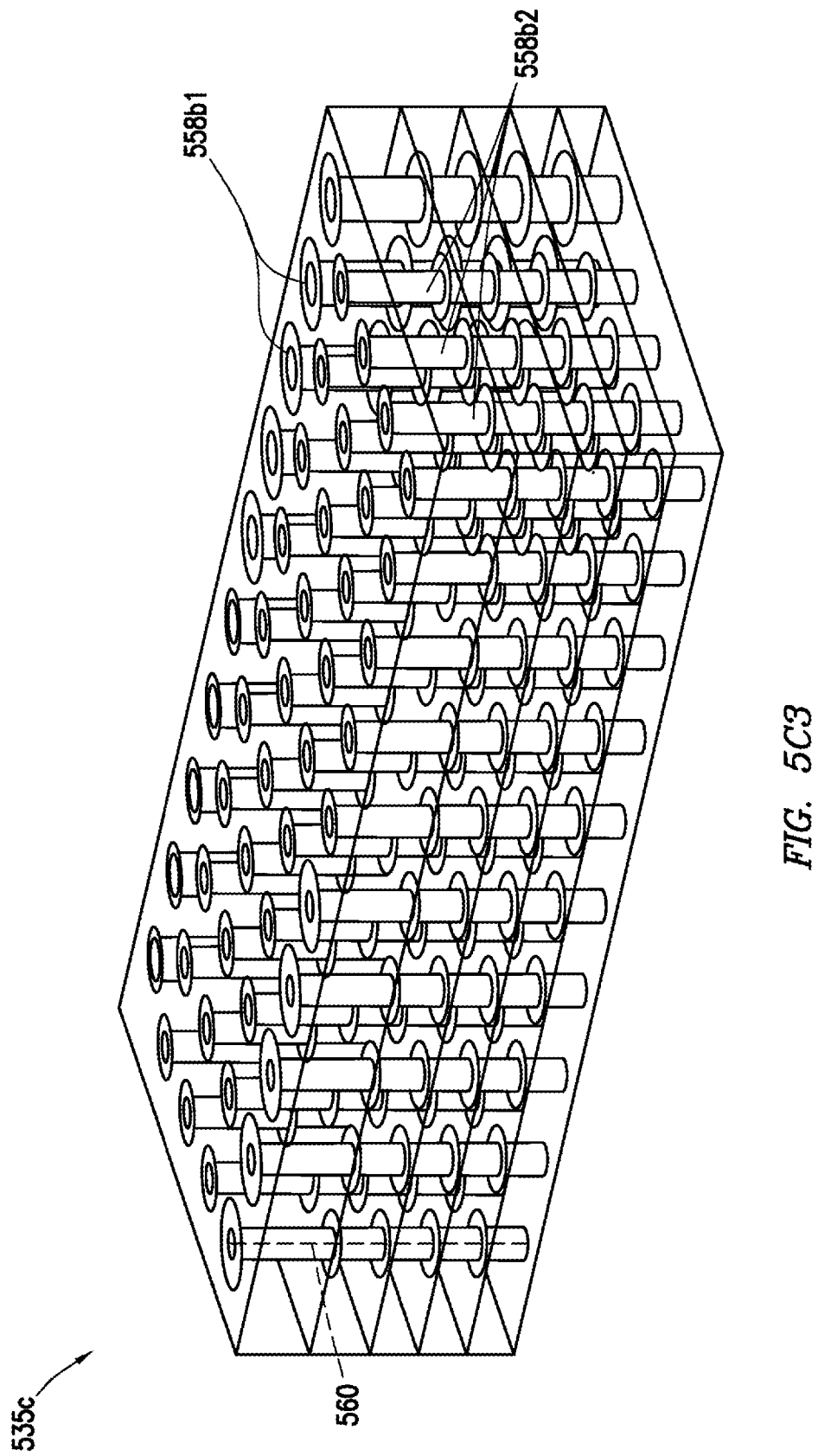
FIG. 5C3

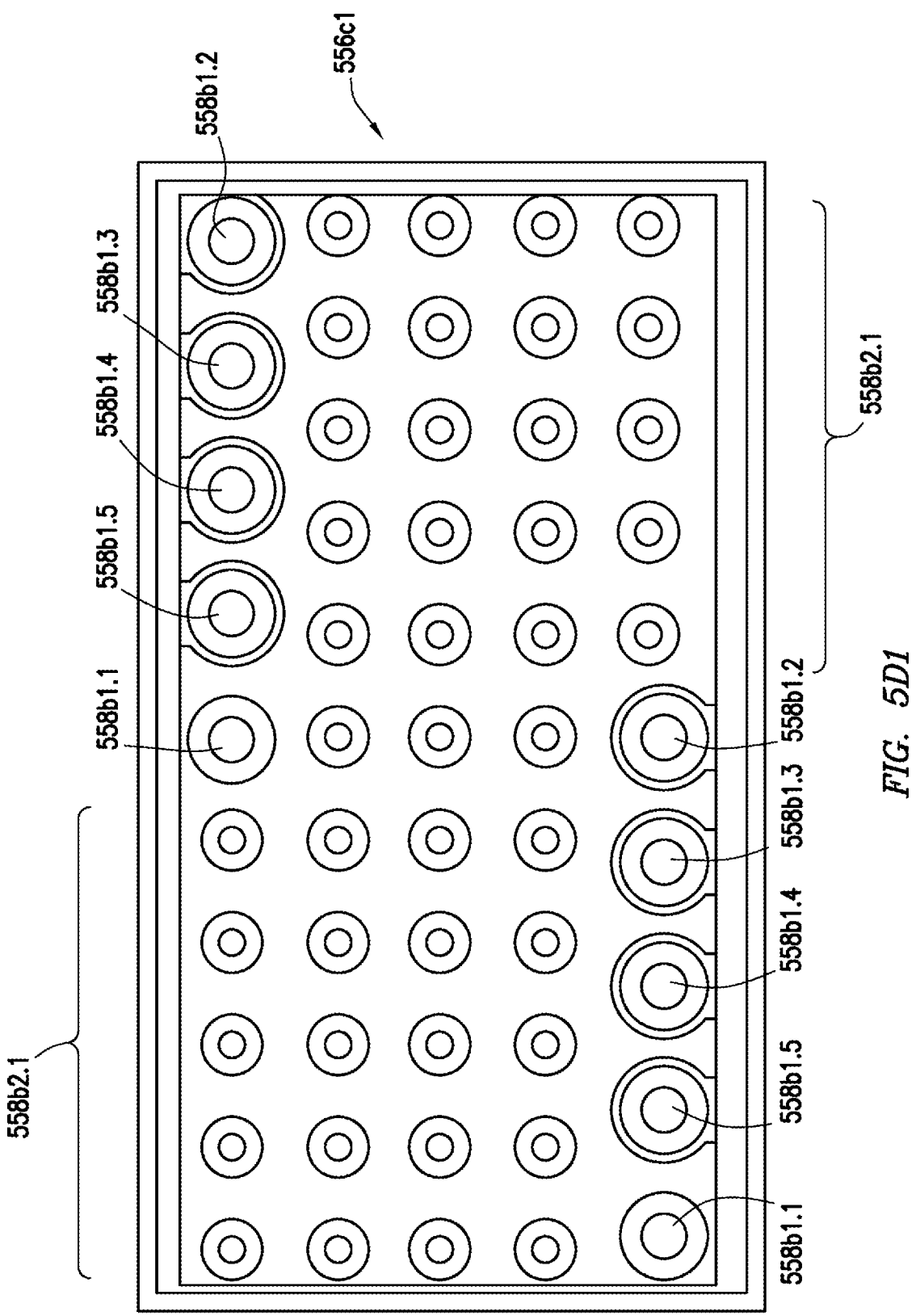
FIG. 5D1

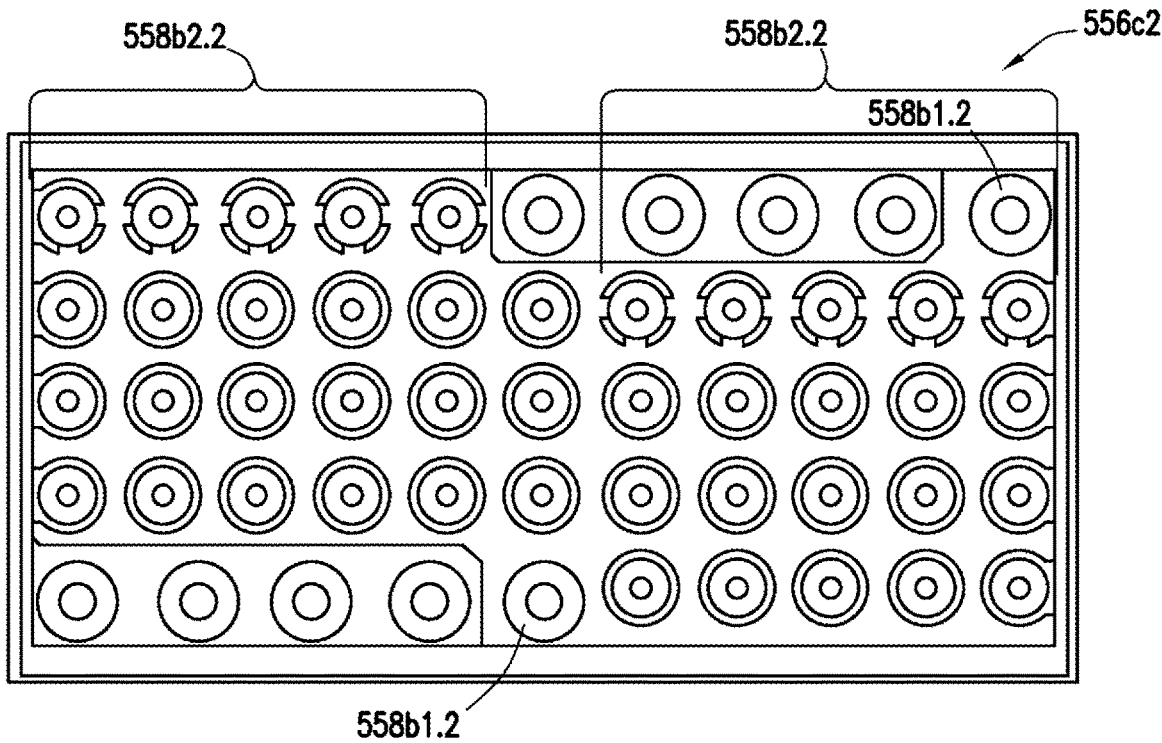
FIG. 5D2
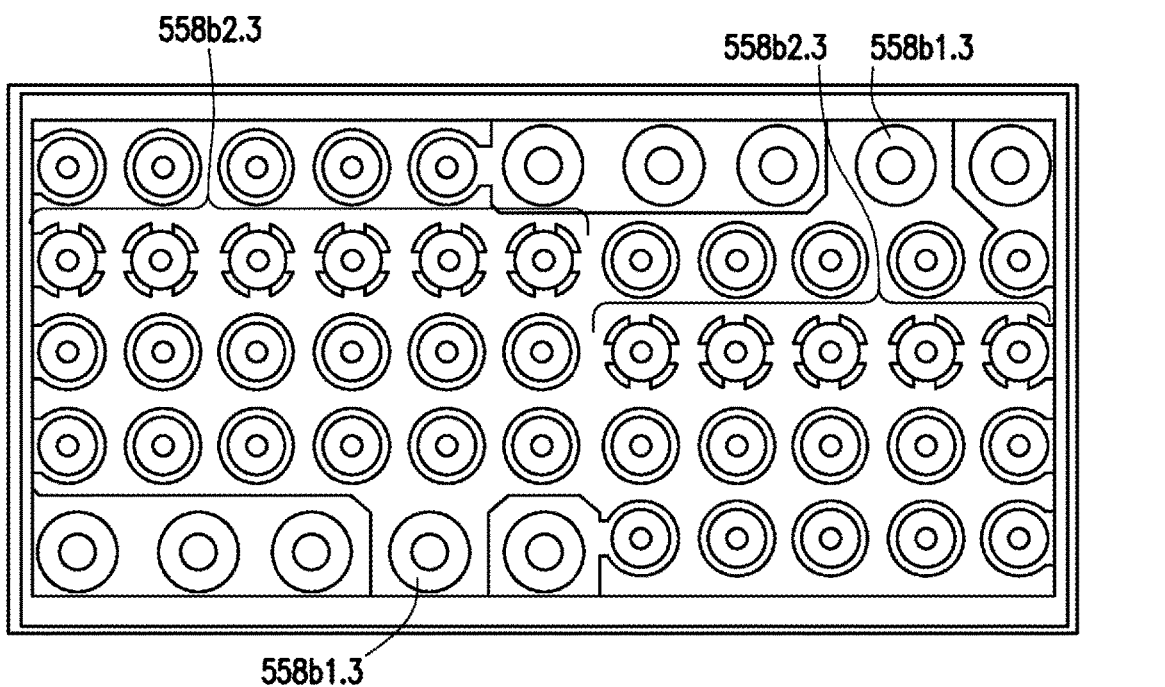
FIG. 5D3

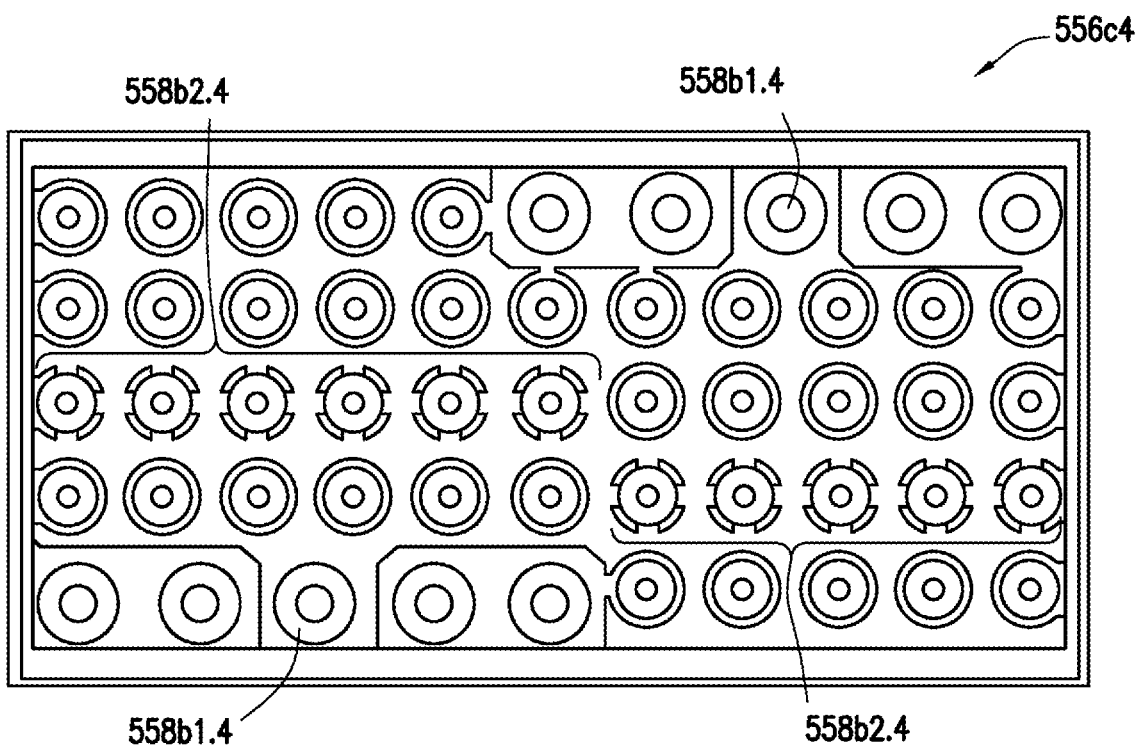
FIG. 5D4
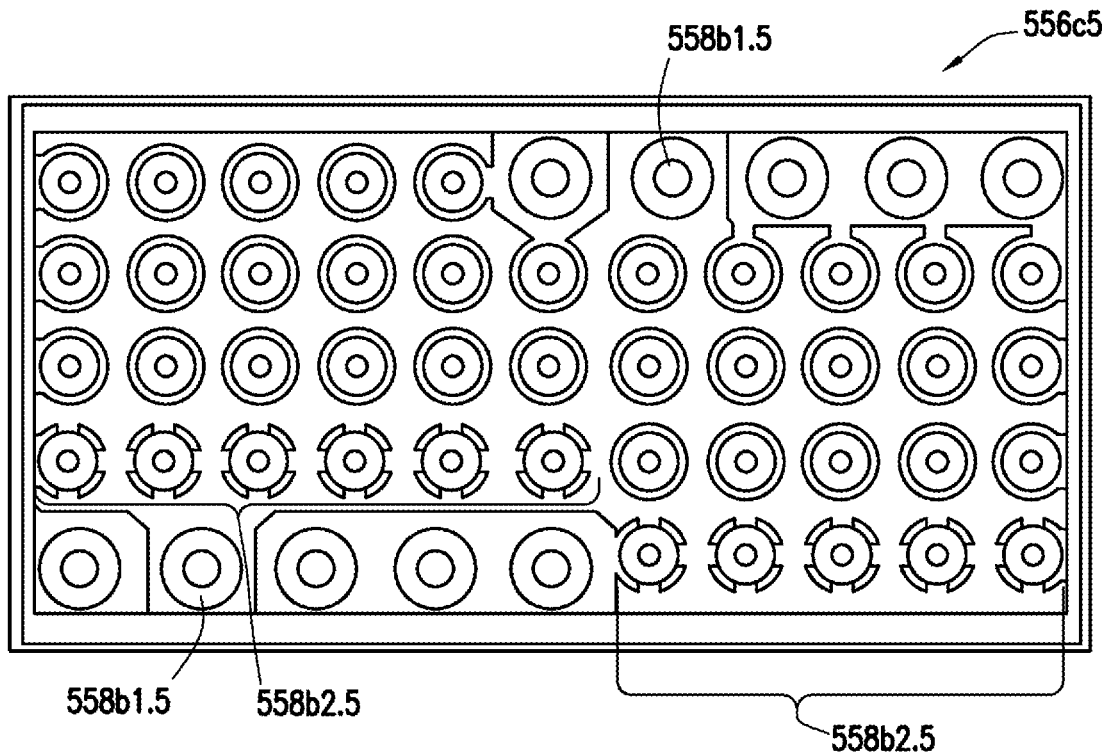
FIG. 5D5

WELLSITE SENSOR ASSEMBLY AND METHOD OF USING SAME

CROSS-REFERENCE TO RELATED APPLICATIONS

This application is a continuation of U.S. patent application Ser. No. 15/567,851, filed Oct. 19, 2017, which is a national stage entry of PCT/US2016/028525, filed Apr. 20, 2016, which claims the benefit of U.S. Provisional Application No. 62/150,217, filed Apr. 20, 2015, each of which are incorporated herein by reference in their entireties for all purposes.

BACKGROUND

This present disclosure relates generally to techniques for performing wellsite operations. More specifically, the present disclosure relates to well site equipment, such as drilling and/or sensing devices.

Oilfield operations may be performed to locate and gather valuable subsurface fluids. Oil rigs are positioned at wellsites, and subsurface equipment, such as a drilling tool, is deployed into the ground by a drill string to reach subsurface reservoirs. At the surface, an oil rig is provided to deploy stands of pipe into the wellbore to form the drill string. Various surface equipment, such as a top drive, a Kelly, and a rotating table, may be used to apply torque to the stands of pipe and threadedly connect the stands of pipe together. A drill bit is mounted on the subsurface end of the drill string, and advanced into the earth from the surface to form a wellbore.

The drill string maybe provided with various subsurface components, such as a bottom hole assembly (BHA), measurement while drilling (MWD), logging while drilling (LWD), telemetry and other drilling tools, to perform various subsurface operations, such as providing power to the drill bit to drill the wellbore and performing subsurface measurements.

The bit may be advanced into the earth to form the well bore. The drilling tool may also be provided with a reamer to assist in enlarging the wellbore during drilling. Examples of reamers are provided in US Patent/Application Nos. 2010/0181115, 2012/0055714, U.S. Pat. Nos. 8,307,921, 7,823,663, 7,703,553, 7,958,953, 6,279,670, and 6,615,933, the entire contents of which are hereby incorporate by reference herein.

SUMMARY

In at least one aspect, the disclosure relates to a wear sensor comprising a base positionable about a surface, a plurality of conductive layers stacked on the base, and a plurality of vias extending through the plurality of conductive layers and to the base. The conductive layers define a wear surface. Each of the conductive layers is electrically connected to at least two of the vias. The two vias are connected electrically in parallel to one another. The vias are electrically connected to electronics to generate a signal through the plurality of vias whereby, upon wear of each of the plurality of conductive layers, a change in the signal of a corresponding of the at least two of the plurality of vias at a depth of the wear is detectable.

The vias may comprise base vias and/or conductor vias. The base vias may be in electrical communication with the base, and may comprise a conductor extending therethrough. The conductor may be electrically coupled to a corresponding one of the plurality of conductive layers and to the base. The conductor vias may be distributed about each of the conductive layers. The conductor vias may comprise ten conductor vias extending along a length of the plurality of conductive layers.

Each of the conductor vias may comprise a conductor portion electrically coupled to a corresponding one of the plurality of conductive layers and an insulated portion electrically insulated from a remaining portion of the plurality of conductive layers. The vias may comprise base vias and conductor vias. Each of the base vias and each of the conductor vias may be in electrical communication with a corresponding one of the plurality of conductive layers. The conductor vias may be in electrical communication with the base vias through the corresponding one of the conductive layers. The base vias may be electrically connected to the electronics to generate a signal through the vias. The vias may be tubular members extending vertically through the conductive layers from the wear surface to the base. The vias may be positioned parallel to each other. The conductive layers may comprise copper.

In another aspect, the disclosure relates to a method of sensing wear. The method involves providing a wear sensor comprising a base positionable about a surface, a plurality of conductive layers stacked on the base; and a plurality of vias extending through the plurality of conductive layers and to the base. The conductive layers define a wear surface. The method also involves electrically connecting each of the plurality of conductive layers to at least two of the plurality of vias, electrically connecting in parallel the at least two of the plurality of vias, generating a signal through the plurality of vias by electrically connecting the plurality of vias to electronics, and detecting a depth of wear by detecting a change in the signal of the at least two of the plurality of vias at the depth of wear.

The detecting may involve measuring the signal across more than one of the plurality of vias distributed about the plurality of conductive layers and wherein the detecting comprises detecting the change in the signal from the more than one of the plurality of vias, and/or passing the signal from each of the plurality of conductive layers via a plurality of signal lines to the electronics for the detecting. The generating may involve passing the signal from each of the plurality of conductive layers via a plurality of signal lines, applying a resistance to each of the plurality of signal lines, and passing the signals to the electronics through a combined signal line for the detecting. The generating may involve passing the signals from each of the plurality of conductive layers through an analog to digital converter and to the electronics through at least one signal line for the detecting, and/or passing the signals from each of the plurality of conductive layers through a multiplexer and to the electronics through at least one signal line for the detecting.

In yet another aspect, the disclosure relates to a sensor assembly for a downhole tool positionable in a wellbore, the downhole tool comprising a tool body and a movable component movably positionable about the tool body. The sensor assembly comprises a sensor carried by the movable component to take well site measurements, and electronics positioned in the movable component. The electronics are electrically connected to the sensor to receive the well site measurements therefrom whereby well site parameters are determinable.

The sensor may comprise a position sensor in communication with a reference positioned in the tool body of the downhole tool, and/or a wear sensor positioned about a surface of the movable component. The sensor assembly may also include seals positioned about the sensor, a chassis carried by the movable component, the chassis comprising a sidewall with an electronics chamber to receive the electronics therein, a plug positionable about an opening of the chassis, a bracket to secure the chassis to the movable component, and/or a disc coupled to the chassis, the sensor comprising a position sensor carried by the disc. The electronics may be positioned on an electronics board, may comprise batteries, and/or may comprise a signal converter, an analog to digital converter, a multiplexer, pull-up resistors, line resistors, a memory, a communicator, sensors, a microcontroller, a field programmable gate array, a receiver, a transmitter, and combinations thereof.

Finally, in another aspect the disclosure relates to a sensor assembly for a downhole tool positionable in a well bore penetrating a subterranean formation. The downhole tool comprises a tool body and a movable component movably positionable about the tool body. The sensor assembly comprises references carried by the tool body, a position sensor carried by the movable component to detect the proximity of the position sensor to the references, a wear sensor positioned about a surface of the movable component to detect wear, and electronics carried by the movable component and electrically connected to the position sensor and the wear sensor to receive signals therefrom whereby position and wear of the movable component are determined.

The position sensor and the references may comprise magnets. The position sensor may comprise north magnetic sensors, south magnetic sensors, and/or bi-polar sensors. The sensor assembly further comprises a chassis carried by the movable component. The electronics are positioned in the chassis. The position sensor may comprise a disc with the position sensors on upper and lower surfaces thereof. The disc is connected to the chassis by a stem with a wired connection therethrough. The wired connection may electrically connect the position sensors to the electronics. The wear sensor may comprise a core having a wear surface and conductors positioned at depths about the core, the conductors electrically connected to the electronics. The chassis may comprise a sidewall with an opening and a plug positioned about the opening.

In yet another aspect, the disclosure relates to a downhole tool positionable in a wellbore penetrating a subterranean formation. The downhole tool comprises a tool body, a movable component movably positionable about the tool body, and a sensor assembly. The sensor assembly comprises references carried by the tool body, a position sensor carried by the movable component to detect the proximity of the position sensor to the references, a wear sensor positioned about a surface of the movable component to detect wear, and electronics carried by the movable component and electrically connected to the position sensor and the wear sensor to receive signals therefrom whereby position and wear of the movable component are determined.

The downhole tool may be a reamer and the movable component is a cutter block.

In at least one aspect, the disclosure relates to a wear sensor for a downhole tool positionable in a wellbore. The wear sensor includes a core and conductors. The core is positionable about a surface of the downhole tool, and has a wear surface thereon. The conductors are positioned at various depths about the core, and are electrically connected to electronics in the downhole tool to receive power therefrom and send a signal thereto at each of the depths whereby, upon wear of the core, a change in the signal of the conductors at the depth of the wear is detectable.

The core may comprise a wear resistant material. The core may comprise tungsten carbide, and/or diamond.

The wear sensor may also comprise a carrier positioned about the core. The carrier may comprise a non-conductive material.

The wear sensor may also comprise a support material positionable about the core. The core may have a cylindrical, polygonal, or a plate shape. The core may comprise core layers and the wear sensor may also comprise vias distributed about the core and electrically connected to the conductors and the core layers.

The conductors may comprise a wire, a cable, and/or a conductive layer. The core may be receivable in a pocket of the downhole tool with the wear surface extending about the surface of the downhole tool.

In another aspect the disclosure relates to a sensor assembly for a downhole tool positionable in a wellbore. The sensor assembly includes a core, conductors, and electronics. The core is positionable about a surface of the downhole tool, and has a wear surface thereon. The conductors are positioned at various depths about the core. The electronics are positioned in the downhole tool, and are electrically connected to the conductors. The electronics include a power source to generate a signal through the conductors and a processor to detect the signal of the conductors at each of the depths whereby, upon wear of the core, a change in the signal of the conductors at the depth of the wear is detectable.

The sensor assembly may also comprise an electrical connector electrically connecting the conductors to the electronics. The electrical connector may be a wire, a cable, and/or a wireless connector.

The electronics may comprise a signal converter, an analog to digital converter, a multiplexer, pull-up resistors, line resistors, a memory, a communicator, sensors, a microcontroller, a field programmable gate array, a receiver, and/or a transmitter.

In another aspect, the disclosure relates to a method of sensing wear of a downhole tool positionable in a well bore. The method involves providing the downhole tool with a sensor assembly, the downhole tool comprising a tool body. The sensor assembly includes a core and conductors. The core is positionable about a surface of the downhole tool, and has a wear surface thereon. The conductors are positioned at various depths about the core. The method also involves generating a signal through the conductors, and detecting wear about the surface of the downhole tool by detecting changes in the signal of the conductors as the wear surface is lowed to the various depths of the core.

In another aspect, the disclosure relates to a wear sensor for a downhole tool positionable in a wellbore. The wear sensor includes a base, conductive layers, and vias. The base positionable about a surface of the downhole tool. The conductive layers stacked on the base, the conductive layers defining a wear surface. The vias extend through the conductive layers and to the base, and include base vias and conductor vias. The base vias are in electrical communication with the base. Each of the base vias and each of the conductor vias in electrical communication with a corresponding one of the conductive layers. The conductor vias are in electrical communication with the base vias through the corresponding one of the conductive layers. The base is electrically connected to electronics to generate a signal through the vias whereby, upon wear of the core, a change in the signal of the conductor vias at the depth of the wear is detectable.

The vias may be tubular members extending vertically through the conductive layers from the wear surface to the base, and the vias may be positioned parallel to each other. The vias may comprise a plurality of conductor vias distributed about each of the conductive layers. The conductor vias may comprise ten conductor vias extending along a length of the conductive layers.

The conductive layers may comprise copper. The base vias may comprise a conductor extending therethrough, the conductor electrically coupled to the corresponding one of the conductive layers and to the base.

Each of the conductor vias may comprise a conductor portion electrically coupled to the corresponding one of the conductive layers and an insulated portion electrically insulated from a remaining portion of the conductive layers.

In another aspect, the disclosure relates to a sensor assembly for a downhole tool positionable in a wellbore. The sensor assembly includes a base, conductive layers, vias, and electronics. The base is positionable about a surface of the downhole tool. The conductive layers are stacked on the base, and define a wear surface. The vias extend through the conductive layers and to the base, and include base vias and conductor vias. The base vias are in electrical communication with the base. Each of the base vias and each of the conductor vias in electrical communication with a corresponding one of the conductive layers. The conductor vias are in electrical communication with the base vias through the corresponding one of the conductive layers. The electronics are electrically connected to the base to generate a signal through the vias whereby, upon wear of the core, a change in the signal of the conductor vias at the depth of the wear is detectable.

The electronics may comprise a power supply electrically coupled to the base to send the signal through the vias. The electronics may comprise a ground. The electronics may comprise signal lines, each of the signal lines electrically connecting the corresponding one of the conductive layers to remote electronics.

The remote electronics may comprise a processor and pull up resistors. The remote electronics may comprise a processor; the electronics may comprise resistors in each of the signal lines.

The signal lines may be joined by a common output, the common output electrically coupling the signal lines to the remote electronics. The electronics may comprise a signal converter electrically connected to the corresponding one of the conductive layers, the signal converter electrically connected to the remote electronics by at least one of the signal lines.

The signal converter may comprise one of an analog to digital converter and a multiplexer. The electronics may comprise a signal converter, an analog to digital converter, a multiplexer, pull-up resistors, line resistors, a memory, a communicator, sensors, a microcontroller, a field programmable gate array, a receiver, and/or a transmitter.

In another aspect, the disclosure relates to a method of sensing well site parameters about a downhole tool. The method involves deploying the downhole tool into a wellbore. The downhole tool includes a wear sensor including a base, conductive layers, and vias. The base is positionable about a surface of the downhole tool. The conductive layers are stacked on the base, and define a wear surface. The vias extend through the conductive layers and to the base, and include base vias and conductor vias. The method also involves electrically connecting the base vias and the base, the conductor vias with a corresponding one of the conductive layers, and the conductor vias with the base vias through the corresponding one of the conductive layers; generating signals from the base, through the base vias, and to the conductor vias in each of the conductive layers; and determining a depth of wear about the surface of the downhole tool by measuring the signal over time and detecting a change in the signal as the wear surface wears about the conductive layers.

The determining may comprise measuring the signal across multiple of the conductor vias distributed about the conductive layers and the detecting may comprise detecting a change in the signal from multiple of the conductor vias.

The generating signals may comprise passing the signals from each of the conductive layers via a plurality of signal lines to electronics for the measuring. The generating signals may comprise passing the signals from each of the conductive layers via a plurality of signal lines, applying a resistance to each signal line, and passing the signals to electronics through a combined signal line for the measuring. The generating signals may comprise passing the signals from each of the conductive layers through an analog to digital converter and to electronics through at least one signal line for the measuring. The generating signals may comprise passing the signals from each of the conductive layers through a multiplexer and to electronics through at least one signal line for the measuring.

In another aspect the disclosure relates to a sensor assembly for a downhole tool positionable in a well bore. The downhole tool includes a tool body and a movable component movably positionable about the tool body. The sensor assembly includes a sensor and electronics. The sensor is carried by the movable component to take well site measurements. The electronics are positioned in the movable component, the electronics electrically connected to the sensor to receive the wellsite measurements therefrom whereby well site parameters are determinable.

The sensor may comprise a position sensor coupled to a reference in the tool body of the downhole tool. The sensor may comprise a wear sensor positioned about a surface of the movable component.

The sensor assembly may also comprise seals positioned about the sensor. The sensor assembly may also comprise a chassis carried by the movable component, the chassis comprising a sidewall with an electronics chamber to receive the electronics therein.

The sensor assembly may also comprise a plug positionable about an opening of the chassis. The sensor assembly may also comprise a bracket to secure the chassis to the movable component.

The sensor assembly may also comprise a disc coupled to the chassis, the sensor comprising a position sensor carried by the disc.

The electronics may be positioned on an electronics board. The electronics may comprise batteries. The electronics may comprise a signal converter, an analog to digital converter, a multiplexer, pull-up resistors, line resistors, a memory, a communicator, sensors, a microcontroller, a field programmable gate array, a receiver, and/or a transmitter/

The sensor assembly may also comprise an electrical connector electrically connecting the sensor to the electronics. The electrical connector may be a wire, a cable, and/or a wireless connection.

In yet another aspect, the disclosure relates to a downhole tool positionable in a well bore. The downhole tool includes a tool body, a movable component movably positionable about the tool body, and a sensor assembly. The sensor assembly includes a sensor carried by the movable component to take well site measurements, and electronics positioned in the movable component. The electronics are electrically connected to the sensor to receive the well site measurements therefrom whereby well site parameters are determinable.

The movable component may comprise a cutter block extendable from the tool body. The sensor assembly may also comprise a chassis carried by the movable component, the chassis comprising a sidewall with an electronics chamber therein. The chassis may positioned in a pocket within the cutter block.

The cutter block may have at least one port therethrough, the chassis accessible through at least one port. The sensor may be carried by the movable component, the movable component having a channel extending between the sensor and the chassis.

The downhole tool may also comprise references in communication with the sensors, the references positioned in the tool body of the downhole tool.

In another aspect, the disclosure relates to a method of sensing well site parameters about a downhole tool. The method involves deploying the downhole tool into a wellbore. The downhole tool includes a tool body, a movable component, and a sensor assembly. The sensor assembly includes a sensor carried by the movable component and electronics carried by the movable component. The method also involves taking wellsite measurements with the sensor, collecting the well site measurements from the sensor with the electronics, and determining well site parameters from the wellsite measurements with the electronics.

The deploying may comprise positioning a chassis in the movable component, storing the electronics in the chassis, and coupling the sensor assembly to the electronics.

The method may also comprise positioning a reference in the tool body and detecting the reference with the sensor. The method may also comprise detecting wear of the downhole tool with the sensor by sending a signal to the sensor and detecting a change in the sensor upon the wear about the sensor.

In another aspect, the disclosure relates to a sensor assembly for a downhole tool positionable in a well bore penetrating a subterranean formation. The downhole tool includes a tool body and a movable component movably positionable about the tool body. The sensor assembly includes references carried by the tool body, a position sensor carried by the movable component, a wear sensor positioned about a surface of the movable component sensor to detect wear, a chassis carried by the movable component, and electronics. The position sensor is carried by the movable component, and is positionable about the references to detect when the references are in proximity to the position sensor. The electronics are positioned in the chassis and electrically connected to the position sensor and the wear sensor to receive signals therefrom whereby position and wear of the movable component are determined.

The position sensor and the references may comprise magnets. The position sensor may comprise one of north magnetic sensors, south magnetic sensors, and/or bi-polar sensors.

The position sensor may comprise a disc with the position sensors on upper and lower surfaces thereof. The disc may be connected to the chassis by a stem with a wired connection therethrough, the wired connection electrically connecting the position sensors to the electronics.

The wear sensor may comprise a core having a wear surface and conductors positioned at depths about the core, the conductors electrically connected to the electronics. The chassis may comprise a sidewall with an opening and a plug positioned about the opening.

In another aspect, the disclosure relates to a downhole tool positionable in a wellbore penetrating a subterranean formation. The downhole tool includes a tool body, a movable component movably positionable about the tool body, and a sensor assembly. The sensor assembly includes references carried by the tool body, a position sensor carried by the movable component, a wear sensor positioned about a surface of the movable component sensor to detect wear, a chassis carried by the movable component, and electronics. The position sensor is positionable about the references to detect when the references are in proximity to the position sensor. The electronics are positioned in the chassis and electrically connected to the position sensor and the wear sensor to receive signals therefrom whereby position and wear of the movable component are determined.

The tool body may comprise a drilling tool and the movable component may comprise a cutter block. The movable component may have a pocket to receive the chassis therein, and sensor pockets to receive the position sensor and the wear sensor therein. The movable component may have a communications channel therethrough and a wired communication link in the communications channel, the wired communication link electrically connecting the wear sensor to the electronics.

The downhole tool may also comprise seals in the communications channel. The references may be spaced apart about a surface of the tool body. The downhole tool may also comprise additional electronics in the tool body, the additional electronics electrically connectable to the electronics in the movable component. The additional electronics may be in communication with welllsite units.

In another aspect, the disclosure relates to a method of sensing movement a downhole tool positionable in a well bore penetrating a subterranean formation. The method involves providing the downhole tool with a sensor assembly. The downhole tool includes a tool body and a movable component movably positionable about the tool body. The sensor assembly includes references carried by the tool body, a position sensor carried by the movable component, a wear sensor positioned about a surface of the movable component sensor, a chassis carried by the movable component, and electronics positioned in the chassis and electrically connected to the position sensor and the wear sensor. The method also involves detecting the references with the position sensor when in proximity to the position sensor, detecting wear with the wear sensor, and determining position and wear of the movable component by receiving the detecting from the position sensor and the wear sensor with the electronics.

The detecting the references may comprise changing a signal from the position sensor to the electronics when the position sensor has a magnetic polarity different from a magnetic polarity of the references in proximity thereto. The detecting wear may comprise changing a signal from the wear sensor to the electronics when a conductor at a depth within a core of the wear sensor is damaged.

In another aspect, the disclosure relates to a sensor assembly for a downhole tool positionable in a well bore penetrating a subterranean formation. The downhole tool comprises a tool body and a movable component movably positionable about the tool body. The sensor assembly comprises references and a position sensor. The references comprise magnets distributed about the tool body, with a portion of the magnets having a north polarity and a portion of the magnets having a south polarity. The position sensor is carried by the movable component as the movable component moves relative to the tool body. The position sensor includes at least one pair of spaced-apart magnets. Each of the pairs comprising magnets having a north polarity and a south polarity responsive to the north and south polarity of the reference s whereby a position of the movable component is determined.

The position sensor may also comprise a bi-polar magnet. The sensor assembly may also comprise a chassis carried by the movable component and a disc connected to the chassis, the pair of spaced-apart magnets positioned on opposite sides of the disc.

The references may be linearly spaced along a surface of the downhole tool adjacent the movable component. The magnets of the references may have alternating north and south polarity.

In another aspect, the disclosure relates to a sensor assembly for a downhole tool positionable in a well bore penetrating a subterranean formation. The downhole tool comprises a tool body and a movable component movably positionable about the tool body. The sensor assembly includes references, a position sensor, and electronics. The references comprise magnets distributed about the tool body. A portion of the magnets having a north polarity and a portion of the magnets having a south polarity. The position sensor is carried by the movable component as the movable component moves relative to the tool body. The position sensor comprises at least one pair of spaced-apart magnets. Each of the pairs comprises magnets having a north polarity and a south polarity responsive to the north and south polarity of the references. The electronics are coupled to the position sensor to detect when the position sensor encounters the references whereby a position of the movable component is determined.

The sensor assembly may also comprise a chassis carried by the movable component, the electronics positioned in the chassis. The sensor assembly may also comprise electrical connections between the electronics and the position sensor to pass signals therebetween.

Finally, in another aspect, the disclosure relates to a method of sensing movement of a downhole tool positionable in a wellbore penetrating a subterranean formation. The method involves providing the downhole tool with a sensor assembly. The downhole tool comprises a tool body and a movable component movably positionable about the tool body. The sensor assembly includes references and a position sensor. The references comprise magnets distributed about the tool body, with a portion of the magnets having a north polarity and a portion of the magnets having a south polarity. The position sensor is carried by the movable component as the movable component moves relative to the tool body. The position sensor comprises at least one pair of spaced-apart magnets. Each of the pairs comprises magnets having a north polarity and a south polarity responsive to the north and south polarity of the references. The method also involves detecting the references with the position sensor when in proximity to the position sensor and determining a position of the movable component by receiving the detecting from the position sensor.

BRIEF DESCRIPTION OF THE DRAWINGS

So that the present disclosure can be understood in detail, a more particular description of the invention may be had by reference to the embodiments thereof that are illustrated in the appended drawings. It is to be noted, however, that the appended drawings illustrate example embodiments and are, therefore, not to be considered limiting of its scope. The figures are not necessarily to scale and certain features, and certain views of the figures, may be shown exaggerated in scale or in schematic in the interest of clarity and conciseness.

FIG. 3B is a longitudinal cross-sectional view of the cutter block of FIG. 3A taken along line 3B-3B.

FIGS. 5A and 5B are schematic views of versions of the wear sensor.

FIGS. 5C1-5C3 are perspective, end, and schematic views of a layered version of the wear sensor.

FIGS. 5D1-5D5 are schematic views of layers of the layered wear sensor.

DETAILED DESCRIPTION

The description that follows includes exemplary apparatuses, methods, techniques, and/or instruction sequences that embody techniques of the present subject matter. However, it is understood that the described embodiments may be practiced without these specific details.

The present disclosure relates to a sensor assembly usable with a well site tool deployable into a wellbore. The well site tool includes a drilling assembly with a movable component for performing well site operations, such as reaming, centering, adjusting, deploying, extending, retracting, and/or other operations that may change a position of the movable component about the well site tool.

The sensor assembly includes a chassis, electronics, and at least one sensor for measuring various parameters. The sensor may be a wear sensor capable of measuring wear of the well site component over time, and/or a position sensor capable of measuring movement of the movable component. The wear sensor may be positioned about a surface of the downhole tool. The wear sensor may include electrical conductors at depths along a core. The conductors may send signals that may be monitored. As the core wears over time, the conductors at the worn levels may break, there by altering the signal in a manner that is detectable. Known depths of the conductors can be used to indicate an amount of wear experienced.

The sensor assembly may be a position sensor in a movable portion of the downhole tool with references positioned in a moveable or fixed portion of the downhole tool. The position sensor may detect polarity of the references as the position sensors moves thereabout so that a position of the movable component about the downhole tool can be determined.

The sensor assembly may provide information usable by operators (e.g., drillers) to determine downhole conditions. The information provided may be used to identify a position of subsurface equipment, as well as various wellsite parameters. For example, drillers may be provided with information that may be used to determine how a reamer is performing (e.g., detecting whether a cutter block of a reamer is extended or retracted), how to proceed, and/or what to do in another hole. The sensor assembly may also provide information that may forego the need for performing additional tests, such as ledge tests, wire line caliper runs, and/or other testing, which may affect non-productive time.

Figure 1:
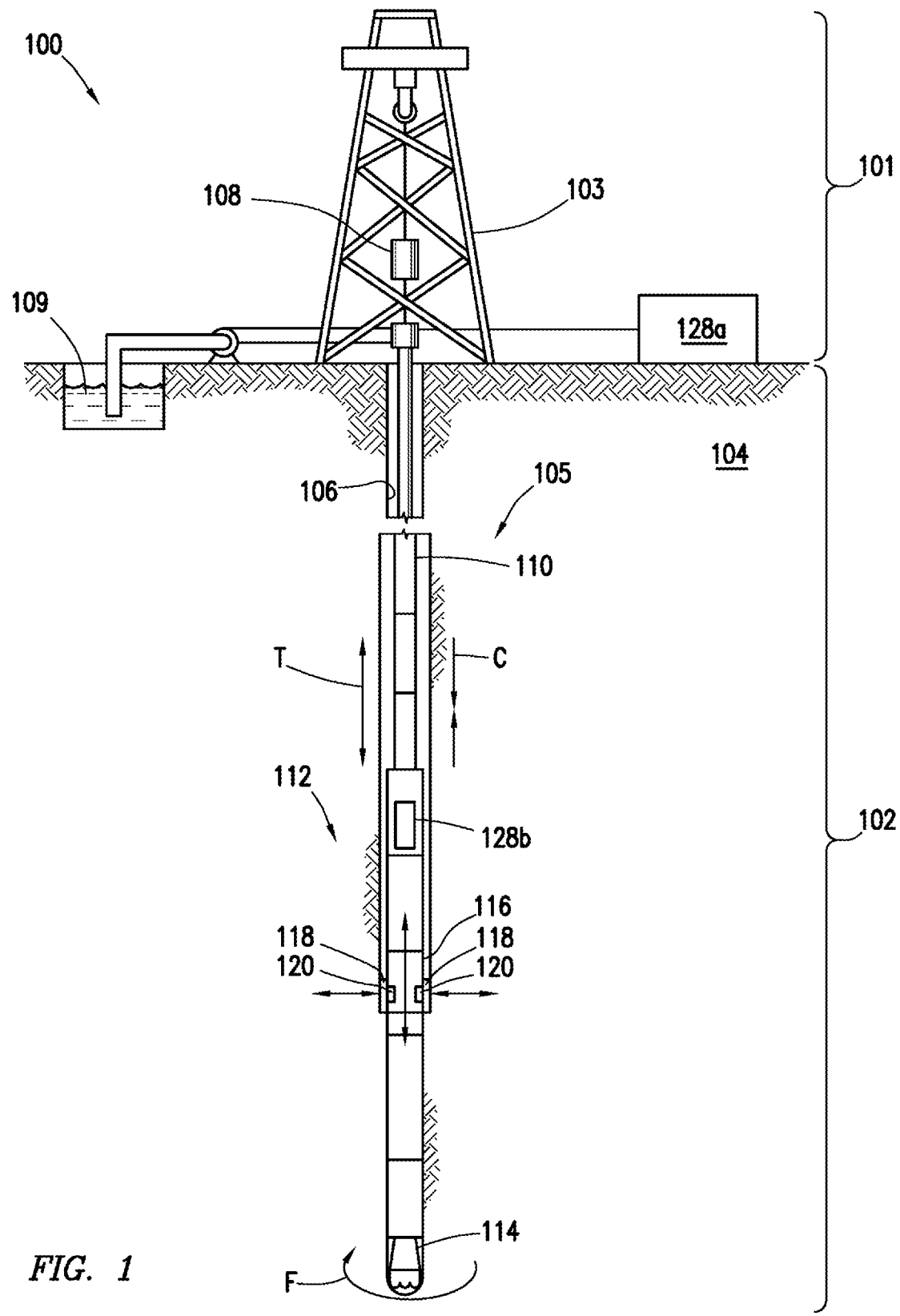
FIG. 1 depicts a schematic view, partially in cross-section, of a well site having a surface system and a subsurface system for drilling a wellbore, the subsurface system comprising a well site tool with a drilling assembly and a sensor assembly.

FIG. 1 depicts a schematic view, partially in cross-section, of a well site 100. While a land-based drilling rig with a specific configuration is depicted, the present disclosure may involve a variety of land based or offshore applications. The well site 100 includes surface equipment 101 and subsurface equipment 102. The surface equipment 101 includes a rig 103 positionable about subterranean formation 104 for performing various well bore operations, such as drilling a wellbore 106.

The surface equipment 101 may include various rig equipment 108, such as a Kelly, rotary table, top drive, elevator, etc., provided at the rig 103 to operate the subsurface equipment 102. A mud pit 109 may be provided as part of the surface equipment 101 for passing mud from the surface equipment 101 and through the subsurface equipment 102. Various flow devices, such as a pump may be used to manipulate the flow of mud about the well site 100.

The flow of mud may be used to activate various portions of the subsurface equipment 102. The subsurface equipment 102 may include a wellsite tool 105 including a drill string 110 with a bottom hole assembly (BHA) 112, and a drill bit 114 at an end thereof. The wellsite tool 105 may be subject to forces, such as tension T, compression C, and/or drilling (e.g., rotation, torque) forces F. Fluid from the mud pit 109 maybe passed through the drill string 110, BHA 112, and out the drill bit 114 as the drill bit 114 is advanced into the formation 104 to form the wellbore 106.

The drill string 110 may include drill pipe, drill collars, coiled tubing or other tubulars used in drilling operations. The BHA 112 is at a lower end of the drill string 110 and contains various subsurface components for performing subsurface operations. As shown, the BHA 112 includes a drilling assembly 116 that may be used to drive the drill bit 114. The BHA 112 may also include various other subsurface components, such as motors, stabilizers, a measurement while drilling tool, a logging while drilling tool, a telemetry unit, rotary steerables, pulsers, shock tools, hole enlargers, stabilizers, coring tools, fishing tools, and/or other subsurface components, at least some of which may have movable components movable about the BHA 112 and/or wellsite tool 105.

In an example, the drilling assembly 116 is a reamer (or hole enlarger) assembly with movable components, such as cutter blocks 118, extendable therefrom for engagement with a wall of the wellbore. The reamer assembly 116 may be used, for example, to enlarge the hole drilled by the drill bit 114. Examples of hole enlargers and/or cutter blocks are provided in US Patent/Application Nos. 2010/0181115, 2012/0055714, U.S. Pat. Nos. 8,307,921, 7,823,663, 7,703,553, 7,958,953, and 6,615,933, previously incorporated herein.

The reamer assembly 116 may be provided with a sensor assembly 120 to detect movement of movable components of the reamer assembly 116. For example, the sensor assembly 120 may be used to detect expansion, retraction, and/or position of the cutter blocks 118 about the BHA 112. One or more sensor assemblies 120 may be placed about one or more well site components, such as those of BHA 112.

One or more well site units (e.g., controllers) 128a,b may be provided to operate the well site 100. For example, a surface unit 128a may be provided at the surface and a subsurface unit 128b may be provided in the well site tool 105. The units 128a,b may be provided with measurement and/or data control devices (e.g., processors, central processing units, etc.) to collect and/or analyze drilling data. The unit(s) 128a,b may operate the surface and/or subsurface equipment 101, 102 based on the drilling data.

While FIG. 1 shows one drilling assembly 116 in the form of a reamer assembly with two cutter blocks 118 extendable therefrom and a sensor assembly 120 provided for each cutter block 118, other configurations may be envisioned. For example, one or more sensor assemblies 120 may be provided about one or more movable components, such as movable arms, collars, blocks, and/or other features of the BHA 112.

Figure 2A:
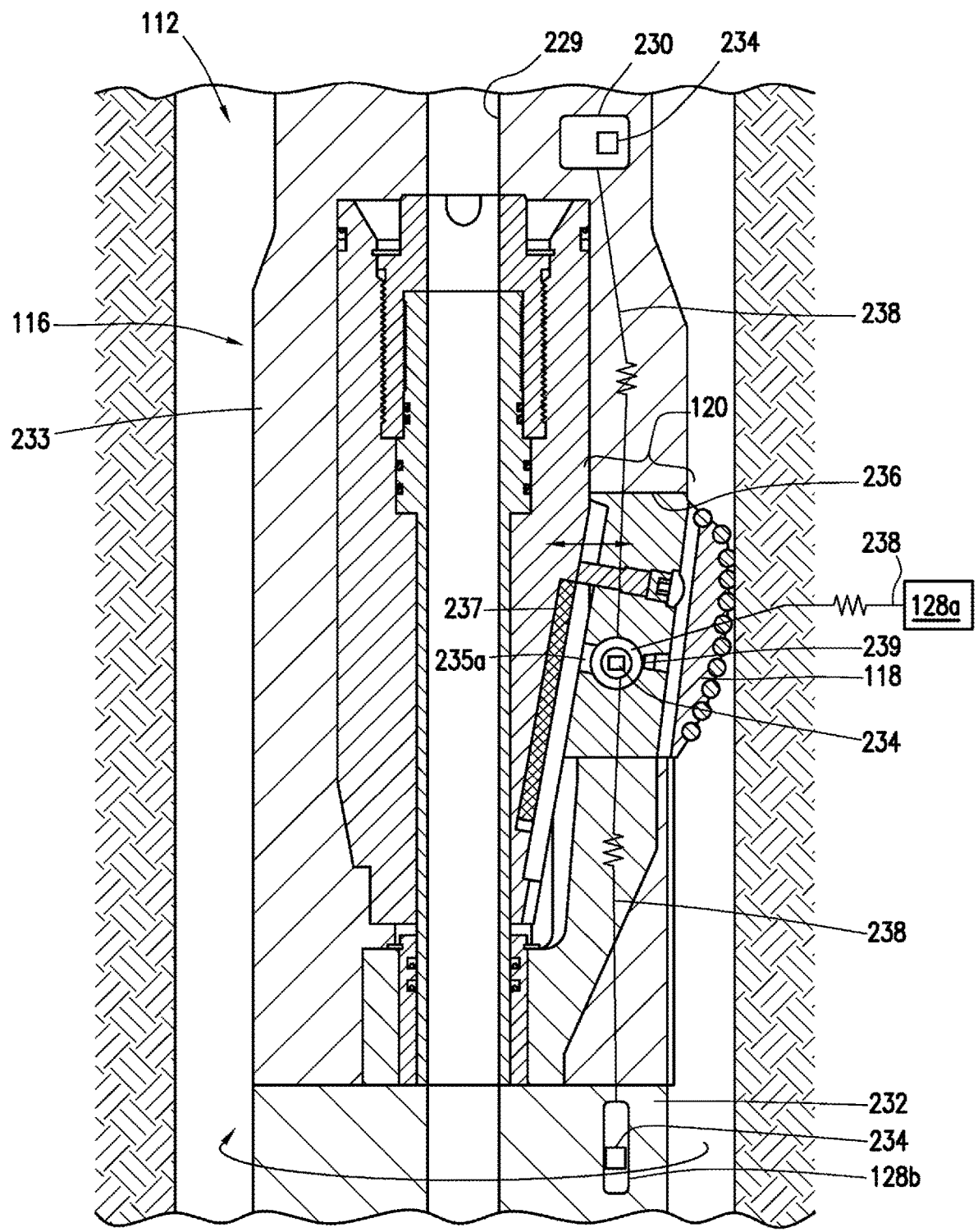
FIGS. 2A and 2B are longitudinal cross-sectional and partial cross-sectional views, respectively, of a portion of the well site tool depicting the drilling assembly and the sensor assembly.
Figure 2B:
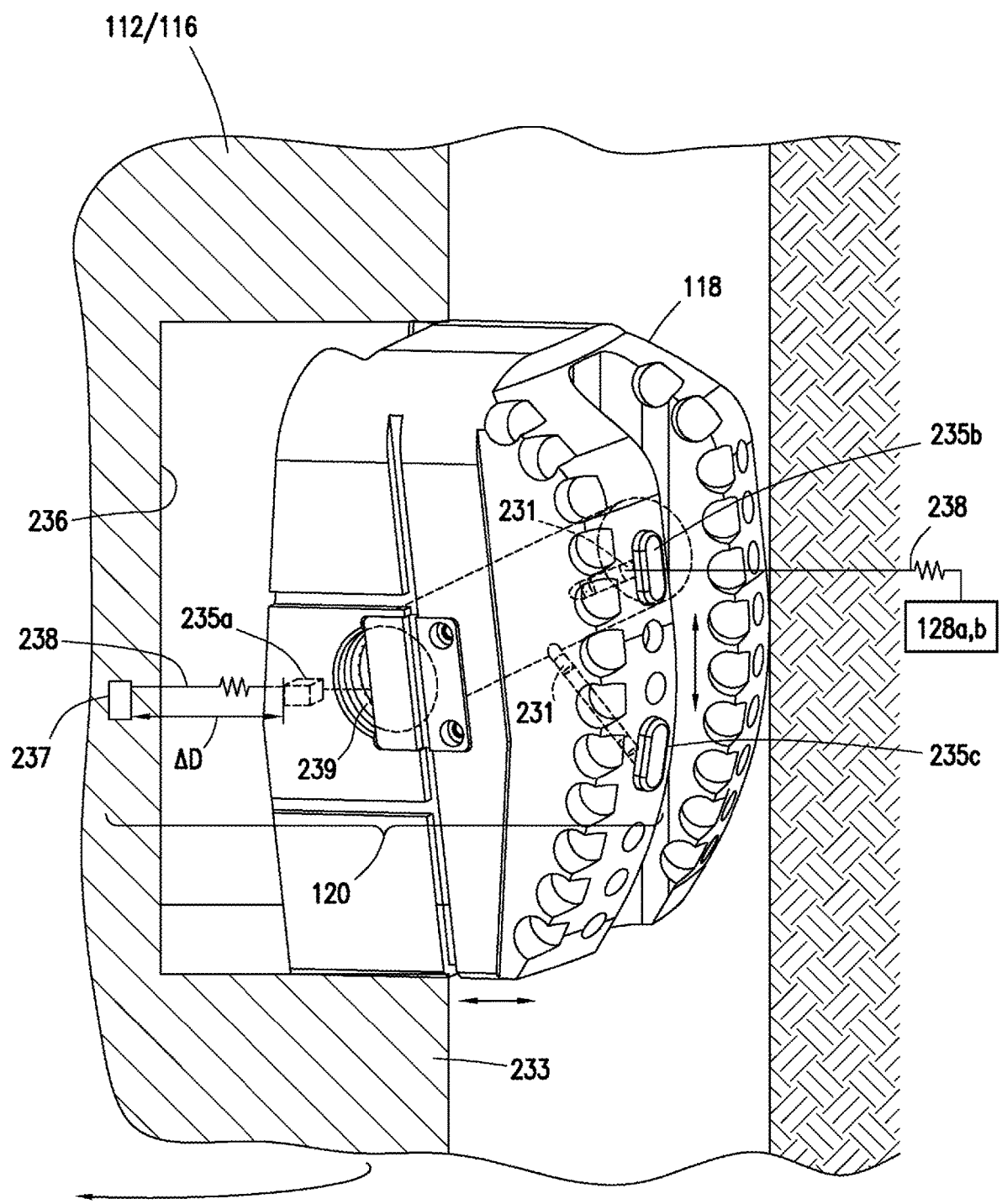

FIGS. 2A and 2B are longitudinal cross-sectional and perspective views, respectively, of a portion of the BHA 112 depicting the reamer assembly 116 and the sensor assembly 120 in greater detail. As shown in these figures, the BHA 112 includes multiple components, including the reamer assembly 116, a telemetry module 230, and a measurement module 232. The BHA 112 has a passage 229 for the passage of mud therethrough.

The reamer assembly 116 includes a drill collar (or body) 233 with a reamer pocket 236 therein to receive the cutter block 118. The reamer assembly 116 may be provided with electronics 234 and/or be coupled to other modules, such as modules 230, 232, with electronics 234 therein for operation thereof. The electronics 234 may be used to activate the reamer assembly 116 and/or the sensor assembly 120.

The telemetry module 230 may provide communication between portions of the BHA 112 and other units (e.g. surface and/or subsurface units 128a,b of FIG. 1). The telemetry module 230 may be provided with various communications capabilities, such as wired drill pipe, mud pulse, electromagnetic, acoustics, and/or other communication means. The measurement module 232 may be provided with various measurement and/or communications capabilities, such as MWD, LWD, and/or others.

The sensor assembly 120 may be coupled to the reamer assembly 116 to collect data therefrom. The sensor assembly 120 may include sensors 235a-c, a reference (or reference sensor) 237, and a chassis 239 positionable about the drilling assembly 116 for measuring well site parameters. The sensor assembly 120 may be provided with measurement capabilities, such as detecting a position of the cutter blocks 118 and/or measuring well site parameters, such as temperature, pressure, and/or other well site parameters. The sensors 235a-c may be Hall Effect, magnetometer, and/or other types of sensors capable of measuring desired well site parameters.

Data collected by the sensor assembly 120 may be stored in electronics 234 in the sensor assembly 120, or passed via communication links 238 to the electronics 234 of the other modules and/or to the surface unit 128a and/or subsurface unit 128b as schematically shown. The telemetry module 230, the measurement module 232, and/or other components of the BHA 112 may communicate and/or work with the reamer assembly 116 and/or the sensor assembly 120. Communication to other well site components in the BHA 112 may also be established with the sensor assembly 120. The sensor assembly 120 may be used, for example, as a pass through device to allow transmission of data and/or as a monitoring system between other well site components in the BHA 112.

As shown in FIG. 2B, the sensor assembly 120 is positioned about the drilling assembly 116. A portion of the sensor assembly 120 is in the cutter block 118 and a portion is in the drill collar 233. The chassis 239 is positioned in the cutter block 118 a variable distance ΔD from the reference 237 in the drill collar (or tool body) 233 as the cutter block 118 extends and retracts. The cutter block 118 is movably positionable in the reamer pocket 236 extending into the drill collar 233. The sensors 235a-c are provided about the cutter block 118 to measure parameters and/or to measure a position of the reference 237. While three sensors 235a-c are shown, one or more sensors may be provided. Seals 231 may also be provided about various portions of the cutter block 118.

One or more of the references 237 and one or more of the sensors 235a-c may be provided. Reference 237 may be a magnetic mechanism used to trigger the sensors (e.g., sensor 235a). Additional accuracy may be provided to determine movement of the cutter block 118 by adding more references 237 detectable by the sensors. By having multiple references 237 acting as triggers, the sensors may provide more resolution to determine the location of the cutter block 118. In at least some cases, the sensors may also determine when the cutter block 118 is stuck.

Figure 3A:
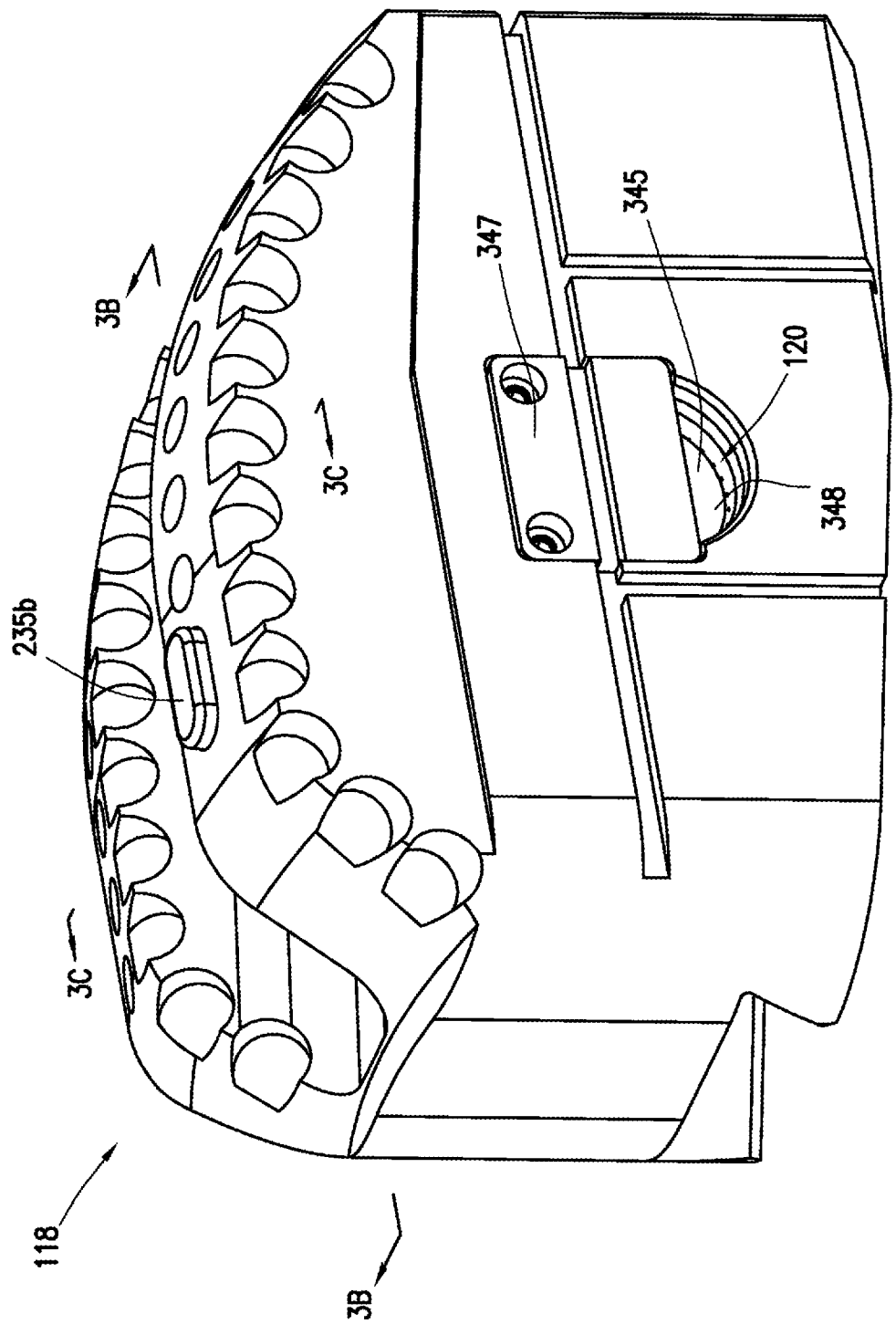
FIG. 3A is a perspective view of a cutter block of the drilling assembly.
Figure 3C:
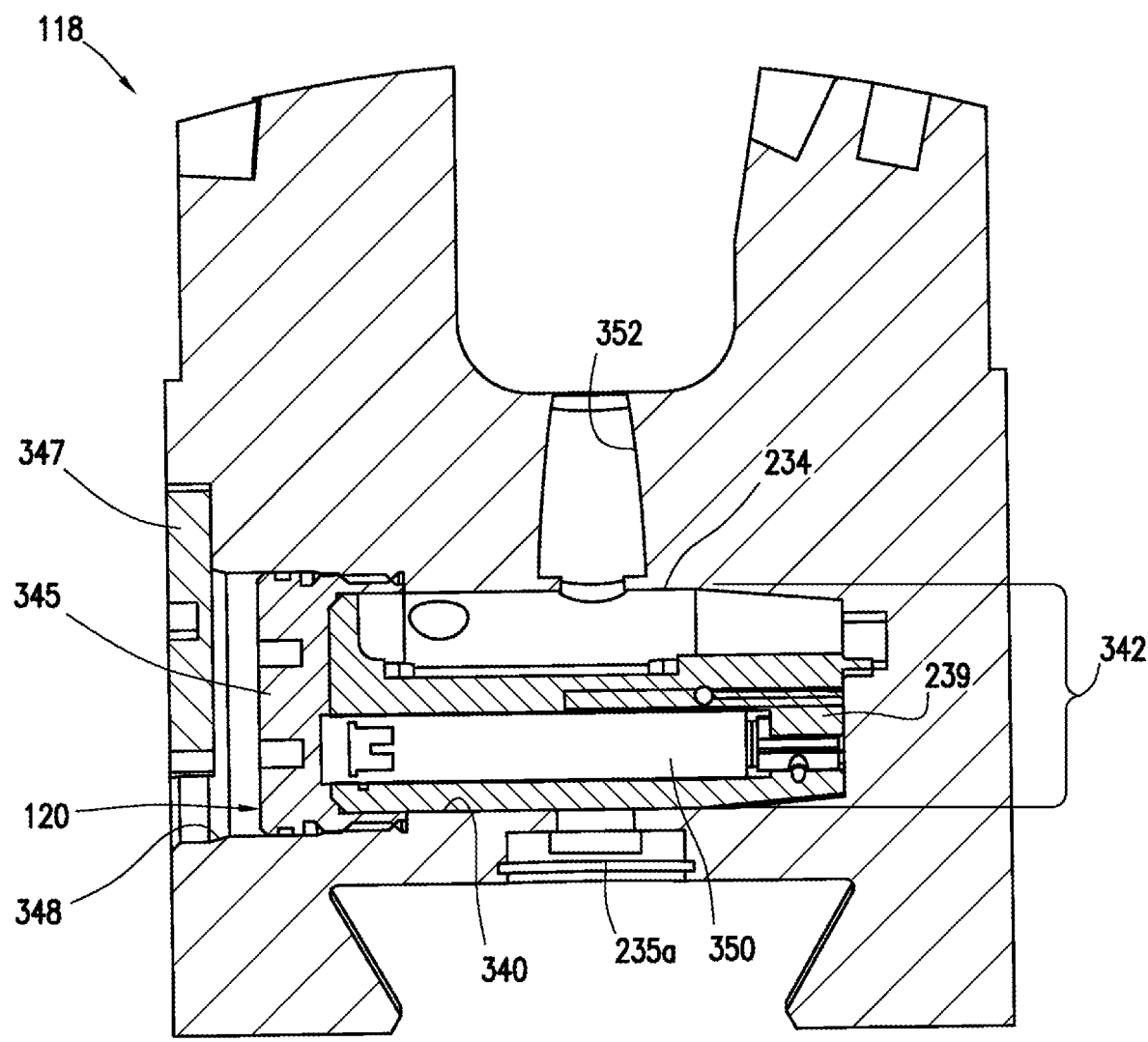
FIG. 3C is a vertical cross-sectional view of the cutter block of FIG. 3A taken along line 3C-3C.

FIGS. 3A-3C provide perspective, longitudinal cross-section, and radial cross-sectional views, respectively, of the cutter block 118 with a portion of the sensor assembly 120 therein. As shown in these views, the cutter block 118 has a cavity 340 to receive the sensor assembly 120 therein. The chassis 239 is in an electronics portion 342 of the cavity 340 with the wear sensor 235b in a sensor portion 344 of the cavity 340, and the communication links 238a,b in a communication channel 346 therebetween. Seals 231 are shown in the communication channel 346 to fluidly isolate the electronics 234 in the cavity 340 from the wellbore.

As also shown in these views, the cutter block 118 may also include a port 348 extending through a side of the cutter block 118 and sensor 235a extending from chassis 239. As shown, the position sensor 235a may rest in a sensor pocket of the cutter block. The sensor assembly 120 may have a plug 345 extendable through the port 348 to connect the chassis 239 with an external cable and provide the communication link 238c thereto. The plug 345 may be secured in place with a bracket 347. The chassis 239 has the electronics 234 and batteries 350 therein. An electronics (e.g., communications) port 352 may also be provided for accessing the electronics 234 through the cutter block 118.

The electronics 234 may optionally be housed within cavity 340 and/or chassis 239 within a casing, such as a mold. The casing may be used, for example, to increase the reliability of the system, to isolate the electronics from the harsh downhole environment, to seal the electronics within the cutter block 118, to provide a cushion, and/or for other reasons.

Figure 4:
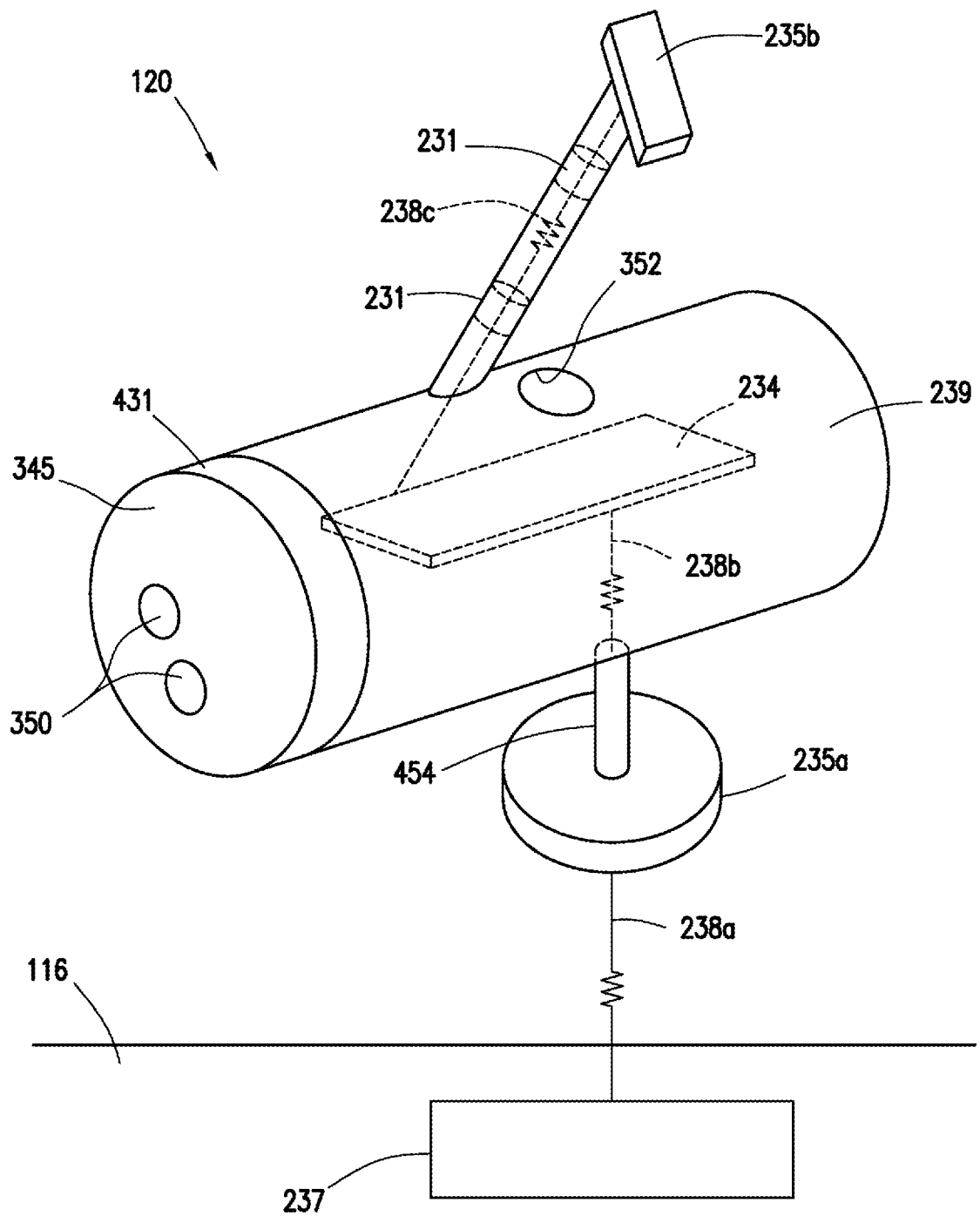
FIG. 4 is a schematic view of the sensor assembly including a wear sensor and a position sensor.

FIG. 4 shows a schematic diagram depicting the sensor assembly 120 in greater detail. The sensor assembly 120 is shown as having a cylindrical chassis 239 with the position sensor 235a and the wear sensor 235b extending therefrom. The chassis 239 has electronics 234, plug 345 on an end of the chassis 239, and the batteries 350 thereon. A seal 431 is provided about the plug 345.

The wear sensor 235b and the position sensor 235a are connected to the electronics 234 by communication links 238a-c. The position sensor 235a is depicted as a disc shaped member attached to the chassis 239 by a stem 454. The reference 237 in the drilling assembly 116 is coupled to the position sensor 235a via communication link 238a. Part or all of the electronics 234 may be placed inside the cutter block 118. Reference 237 may optionally be provided and placed outside the cutter block 118.

The communication links 238a-c may be direct or indirect, wired or wireless connections for communication between various components. For example, the communication links 238b,c may be a wired, direct connection between the wear sensor 235b, the position sensor 235a, and the electronics (board) 234. The communication link 238a may be a wireless connection between the reference 237 and the position sensor 235a. Variations may be provided, such as a wireless communication link between the reference 237 and the electronics (board) 234.

Part or all of the sensor assembly 120 may be designed and mounted to facilitate assembly and/or replacement as needed. For example, part or all of the sensor assembly 120 may be mounted into the cutter block 118 and sealed by seals 231, 431 from drilling fluid, high pressure and/or any other downhole environment elements that may damage the sensor assembly 118.

Figure 5E:
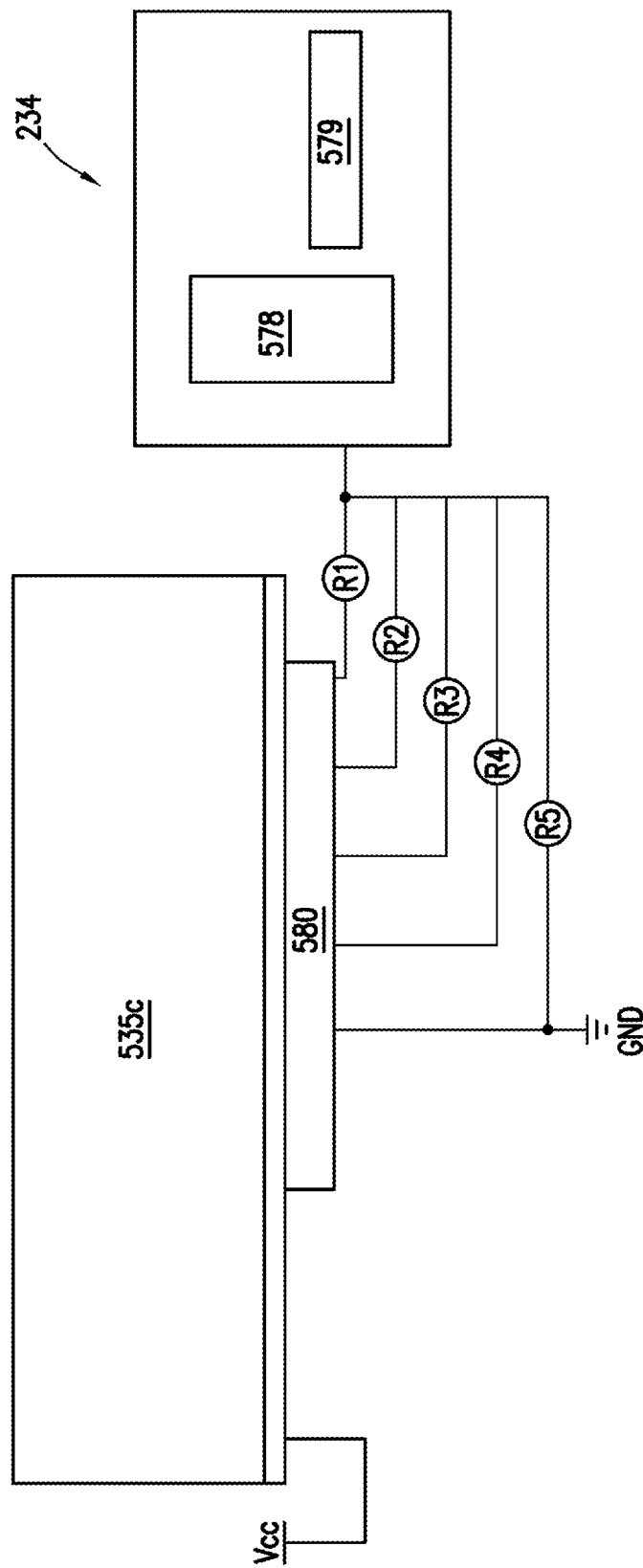
FIG. 5E is a schematic view depicting operation of the layered wear sensor.

FIGS. 5A-5E depict various configurations of a wear sensor. FIGS. 5A and 5B are schematic views of wear sensors 535a,b usable with the sensor assembly 120. FIG. 5A shows a concentric (radial) version of the wear sensor 535a. FIG. 5B shows a plate (linear) version of the wear sensor 535b. The wear sensors 535a,b may be used, for example, to detect wear of the cutter block 118 over time.

These wear sensors 535a,b each include a core 556a,b, a carrier 558a, and one or more conductors 560. The core 556a,b may be, for example, a wear and/or impact resistant material (e.g., tungsten carbide, polycrystalline diamond, etc.) to support the wear sensor 535a,b for engagement with the wellbore wall. The core 556a,b has one or more of the conductors 560 supported therein. The conductors 560 may be electrical wires, cables, or other devices capable of sending electrical signals.

The core 556a,b may be supported by the carrier 558a. The carrier 558a may be a non-conductive material (e.g., polyamide, elastomer, PEEK, etc.) As shown, the core 556a,b, carrier 558a, and/or conductors 560 may be of any shape (e.g., elliptical, polygonal, etc.) positionable along an outer surface of the cutter block 118 (or other component) and extending therebelow.

As shown in FIGS. 5A and 5B, the wear sensors 535a,b may be provided with various options, such as a support material 564, connectors 566, and/or other features. One or more layers of various materials capable of operatively supporting the conductors 560 may be provided. Connectors 566 may communicatively couple the conductors 560 to electronics 234 for operation therewith. The connectors 566 may be, for example, electrical wires, cables, and/or other devices capable of sending electrical signals.

The conductors 560 may be electrically coupled to the electronics 234 directly and/or by the connectors 566. The conductors 560 may extend radially and/or linearly about the core 556*a*. The surface end 562 of the wear sensors 535*a,b* may wear over time as the cutter block 118 engages the wellbore wall as indicated by the downward arrows. As the surface end 562 is removed, conductors 560 positioned at various locations along the core 556*a,b* may be revealed. As the conductors 560 are revealed, changes in electrical signals generated therefrom are detectable with the electronics 234. This information may be used to determine wear of the cutter blocks 118 over time.

FIGS. 5C1-5E show another version of the wear sensor 535*c* in a layered configuration. FIGS. 5C1-5C3 show various views of the wear sensor. FIGS. 5D1-5D5 show each of the layers of the wear sensor 535*c*. FIG. 5E shows operation of the wear sensor 535*c*. As shown in these views, the layered wear sensor 535*c* includes core layers 556*c*1-*c*5, vias 558*b*1,*b*2, and one or more conductors 560. The core in this version comprises conductive layers 556*c*2-*c*5 supported on a base layer 556*c*1.

As shown, the core layers 556*c*1-*c*5 are horizontal layers wearable over time as the wear sensor 535*c* engages a surface of the wellbore 106 during operation. The base layer 556*c*1 is at a bottom end thereof with the conductive layers 556*c*2-*c*5 stacked thereon. The stacked conductive layers 556*c*2-*c*5 are stacked to define a top wear surface that lowers towards the base layer 556*c*1 as each layer 556*c*2-*c*5 is removed by wear over time. Each of the core layers 556*c*1-*c*5 include a conductive portion made of a conductive material, such as copper. The core layers 556*c*1-*c*5 are configured to receivingly and communicatively support vias 558*b*1,*b*2 therein.

Vias 558*b*1,*b*2 are elongate, conductive tubular members vertically positioned in the core layers 556*c*1-*c*5. A bottom end of each via 558*b*1,*b*2 is supported on the base layer 556*c*1 for electrical communication therewith. The vias 558*b*1,*b*2 may be electrical tubes including a conductive tubing made of copper or other conductive material. The vias 558*b*1,*b*2 may be conductive for electrical communication with a given core layer, and have an insulator about a portion thereof to isolate the via from other core layers. The base vias 558*b*1 may support the conductors 560 therein for selective communication with the core layers 556*c*1-*c*5.

As shown by FIGS. 5D1-5D5, base vias 558*b*1.1-1.5 and conductor vias 558*b*2.1-2.5 may be provided through each layer 556*c*1-*c*5. Certain base vias 558*b*1.1-1.5 in each layer may be defined for communication with the base layer 556*c*1. In the example shown, each core layer 556*c*1-*c*5 includes a pair of base vias 558*b*1.1-1.5 and set of 10 conductor vias 558*b*2.1-2.5. The pair of vias 558*b*1.5-558*b*1.2 in each conductive layer 556*c*5-556*c*2, respectively, communicates with the base layer 556*c*1. The set of 10 conductor vias 558*b*2.5-2.2 in each conductive layer 556*c*5-556*c*2, respectively, may be connected in parallel such that conductor vias 558*b*2.5-2.2 are in contact with the conductive layers 556*c*5-*c*2 to establish a multi-contact connection and send a signal to the base layer 556*c*1 through the pair of base vias 558*b*1.5-1.1.

One or more base and/or conductor vias may be dispersed about one or more layers to generate desired signals. For example, multiple vias may be dispersed about the layers such that, upon wearing away of one or more of the vias, the signal is lost. In at least some cases, the entire layer may be worn away before the signal is lost indicating that the given core layer is worn.

Multiple layers may be used to detect depths of wear by detecting which layers have lost signal and which are still intact. Multiple vias may be used such that wear of the entire layer may be required before the signal is terminated. This may be used, for example, to prevent signaling in cases where impact from partial damage (e.g., a gouge) may break the connection with a single connector 566. Multiple conductor vias 558*b*2.5-2.2 may be distributed across the layers so that the signal generated by each layer may indicate whether the layer is intact or not due to damage to one or more vias. For example, if the signal from the one via from a layer is lost or changed, which may indicate either failure to such via, for example, due to a gouge in the layer, such a failure would not indicate wear across the layer. In another example, if the signal to multiple vias in a layer is lost or changed, this may indicate wear across the layer. In this manner, the signal to one or more vias across a given layer may be used to determine if actual wear has occurred and/or prevent false indication of wear across the layer when only a gouge in the layer has occurred.

As shown in FIG. 5E, the wear sensor 535*c* may generate a voltage Vcc readable by a detector, such as electronics 234 of FIG. 4. The electronics 234 may have a variety of configurations capable of detecting signals from the wear sensor 535*c*. For example, the electronics 234 may include a processor 578 (e.g., microprocessor ($\mu$C)) and one or more pull-up resistors 579. The processor 578 may have interrupt capabilities, for example, to allow the processor 578 to remain in a low power state during operation.

The electronics 234 may also include or be coupled to a signal converter 580 (such as an A/D converter or multiplexer), and/or line resistors RI-R5. One or more of these components and/or other components (such as those provided in FIGS. 7A-7B) may optionally be provided. Part or all of the various electronics 234 and/or electrical components may be provided in the wear sensor 535*c* (e.g., at the base layer 556*c*1 of FIG. 5C2).

The core layers 556*c*1-*c*5 may be linked to the electronics 234 in various configurations, such as in parallel as shown. Each layer may be coupled to the electronics 234 using a separate signal line (e.g., conductor 560) for each layer joined by a common ground (GND) line as shown. When used with certain electronics, a single line may extend from the wear sensor 535*c* and the multiple signal lines to provide a single output to the electronics 234 as shown. Optionally, all signal lines may extend between the wear sensor 535*c* and the electronics 234 for communication therewith.

The base layer 556*c*1 completes a loop with each layer that allows wear values to be communicated with the electronics 234. The voltage generated from each layer 556*c*2-5 may be measured. The layers may have a given thickness that determines an amount of wear. The thickness may be used to define a resolution of wear, with a greater thickness providing a lower resolution of wear measurement. Complete wear of a layer may ground such layer.

As the core layers 556*c*5-*c*1 wear over time, the corresponding vias 558*b*1.1-1.5,*b*2.1-2.5 wear over time, thereby changing the electrical connection and signal for the worn layer. Changes in such signal may be detected by the electronics 234. The output of each layer may be at a low voltage indicating no wear to such layer. Upon wear of the layer and damage to the connection, a higher voltage may be generated. Such voltages may be passed from the wear sensor 535c to the electronics 234 for processing. The signal converter 580 may be used to convert the signal for measurement by the electronics 234.

In a first basic example, the pull-up resistors 579 may be used to convert the output signal to high voltage once the layer is worn. In other words, the layer may be at low voltage Vcc by being tied to a ground GND. Once the layer is worn, voltage Vcc jumps from low to high voltage indicating to the microprocessor (μC) 578 that the layer is now worn. When the layer that is being measured is fully intact, the voltage will be low. When the layer is completely removed, the voltage will begin to measure high due to the pull-up resistor 579. The pull-up resistor 579 may be chosen to minimize effects of drilling fluids that may affect measurements made by the electronics 234.

In a second parallel resistor example, the same process is used, except that the number of signals needed to the electronics 234 may be reduced. A different resistor R1-R5 is provided in series with each line from the wear sensor 535c, with all of the lines joined at the output to the electronics 234 and linked by a common ground GND to define a voltage divider circuit as shown. The resistors R1-R5 may be used in addition to or in place of the pull-up resistors 579. The resistor R1-R5 in each layer affects the output of this voltage divider circuit. A different total resistance may be provided as the parallel resistance changes with each trace/layer.

Once the layer is worn, the output changes on the voltage divider. As each layer in the wear sensor 535c wears away, a corresponding line to the electronics 234 discontinues sending a signal to the electronics 234. In this manner, the voltage divider circuit may be used to determine whether a layer has been worn or not. Based on that voltage value, it can be determined if a certain level was worn or not.

In a third multiplexer example, more resolution may be provided by using a signal converter 580, such as a multiplexer. Resistors RI-R5 are not required in this version. The signal lines from the wear sensor 535c may be joined by the common ground GND and connected to the electronics 234 for measurement. The lines corresponding to each layer in the wear sensor 535c may be selectively sent to the electronics 234. In other words, signals from each layer may be selectively monitored and passed to the electronics 234 by allowing the microprocessor 578 to selectively view output from select signal lines. Using the value of the select lines and voltage level of the output pin, it can be determined whether a given layer is worn or not.

In this example, the multiplexer 580 may be positioned on the base layer 556c1. One or more signal lines may extend from the multiplexer 580 to the electronics 234. A reduced number of lines may be provided between the wear sensor 535c and the electronics 234. This reduced number of lines may optionally be used with an increase d number of layers in the wear sensor 535c.

In a fourth ADC (analog to digital converter) example, the signal converter 580 may be an ADC converter used to convert the signals coming from the different layers into a single digital output that goes to the electronics 234. Resistors R1-R5 and at least some of the lines between the wear sensor 535c and the electronics 234 may be eliminated. That digital output changes as the layers get worn. Based on that digital value coming from the ADC 580, the level of wear can be determined. The ADC 580 may also be used to poll each layer. The ADC 580 may be used to reduce the number of signal lines while enabling a larger number of layers on the wear sensor to be monitored. Additionally, the ADC 580 may be used to increase resolution or total wear measurement capability.

While a specific configuration is shown with optional electronics, various combinations of part or all of the components shown may be used to generate desired measurements.

Figure 6A:
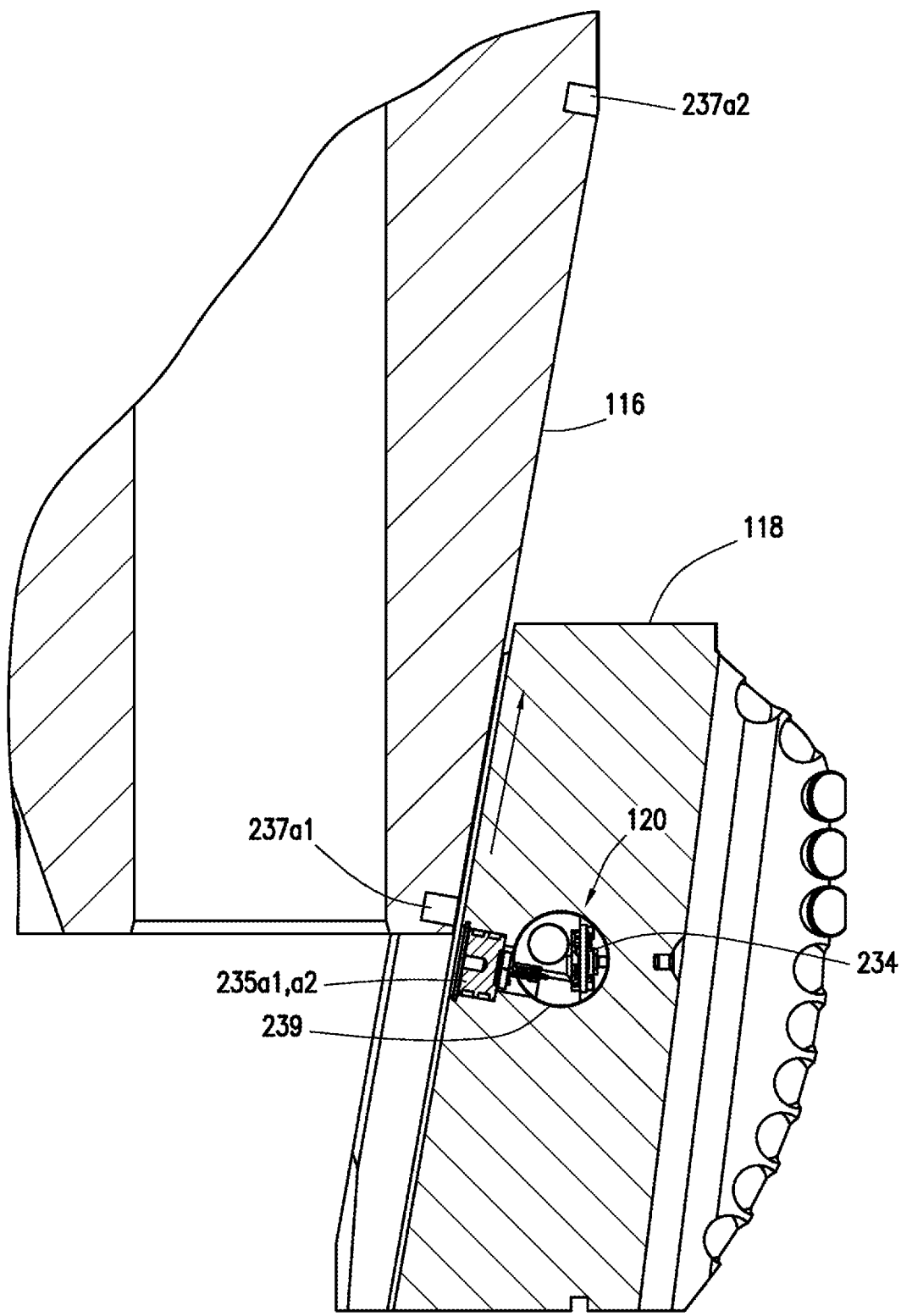
FIGS. 6A-6B are cross-sectional views of a cutter block in an extended and retracted position, respectively, the cutter block having a pair of position sensors positionable relative to references in the tool body.
Figure 6B:
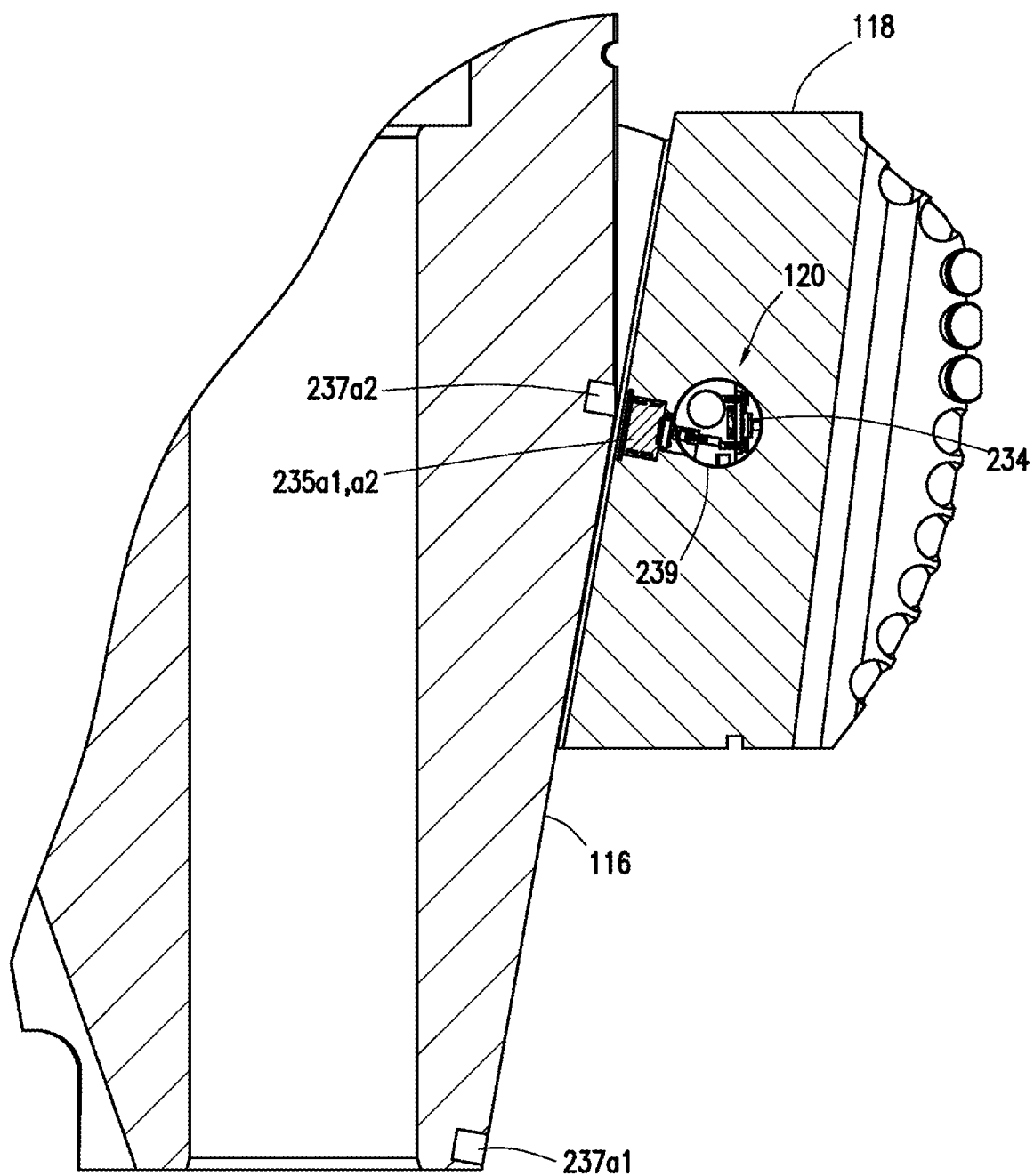

FIGS. 6A-6D show operation of the sensor assembly 120 for detecting position of the cutter block 118 relative to the drilling assembly 116. FIGS. 6A and 6B show the cutter block 118 in a first and second position, respectively. The cutter block 118 of FIGS. 6A-6B has a pair of position sensors 235a1,a2 and a pair of references 237a1,a2.

The pair of position sensors 235a1,a2 are located in close proximity to each other within the cutter block 118. The pair of references 237a1,a2 are spaced apart within the drilling assembly 116. Each of the position sensors 235a1,a2 have an indicator, such as a magnet sensitive to magnetic fields with different polarity (e.g., north (N) and south (S), respectively). Each of the references 237a1,a2 have magnets with different polarity (e.g., north (N) and south (S), respectively).

The sensors 235a1,a2 may be one or more of the same or difference sensors, such as magnetometers or, Hall Effect sensors, etc., orientated to detect north and south facing fields. For example, sensors 235a1,a2 could be a pair of Hall Effect sensors oriented to detect north and south facing fields, respectively.

The sensor assembly 120 is depicted in cutter block 118 as having multiple position sensors 235a1,a2 in communication with electronics 234 in chassis 239 and references 237a1,a2 along opposite ends of a path of travel of the cutter block 118 of the drilling assembly 116. The position sensors 235a1-a2 may be provided with a polarity switchable upon encountering references 237a1,a2 of different polarity.

As the position sensors 235a1,a2 are positioned near the reference 237a1, the position sensor 235a1 with N polarity is repelled by the reference 237a1 having the same polarity N. The position sensor 235a1 is thereby shifted and sends an 'on' signal detectable by the electronics 234. In the case of FIG. 6A, the electronics 234 detect the shift by the position sensor 235a1 and determines that cutter block 118 is in the retracted position. In the case of FIG. 6B, the electronics 234 detect the shift by the position sensor 235a2 with the same polarity as the reference 237a2 and determines that cutter block 118 is in the extended position.

As the sensors 235a1,a2 move relative to references 237a1,a2, the sensor 235a1,a2 with the same polarity as the adjacent reference 237a1,a2 (or matching sensor) sends an 'on' signal detectable by the electronics 234. As the sensor moves away from the corresponding reference, this sensor sends an 'off' signal detectable by the electronics. In the event that both position sensors 235a1,a2 are in the 'off' state, the electronics 234 determine that the cutter block 118 is between references 237a1,a2. The electronics 234 may actively monitor changes in the sensor(s) 235a1,a2 and/or references 237a1,a2 as the cutter block 118 moves. The electronics 234 may also determine whether the cutter block 118 is extended or not, determine when a change occurred, and/or capture (e.g., and/or send) data from the sensors 235a1,a2.

Figure 6C:
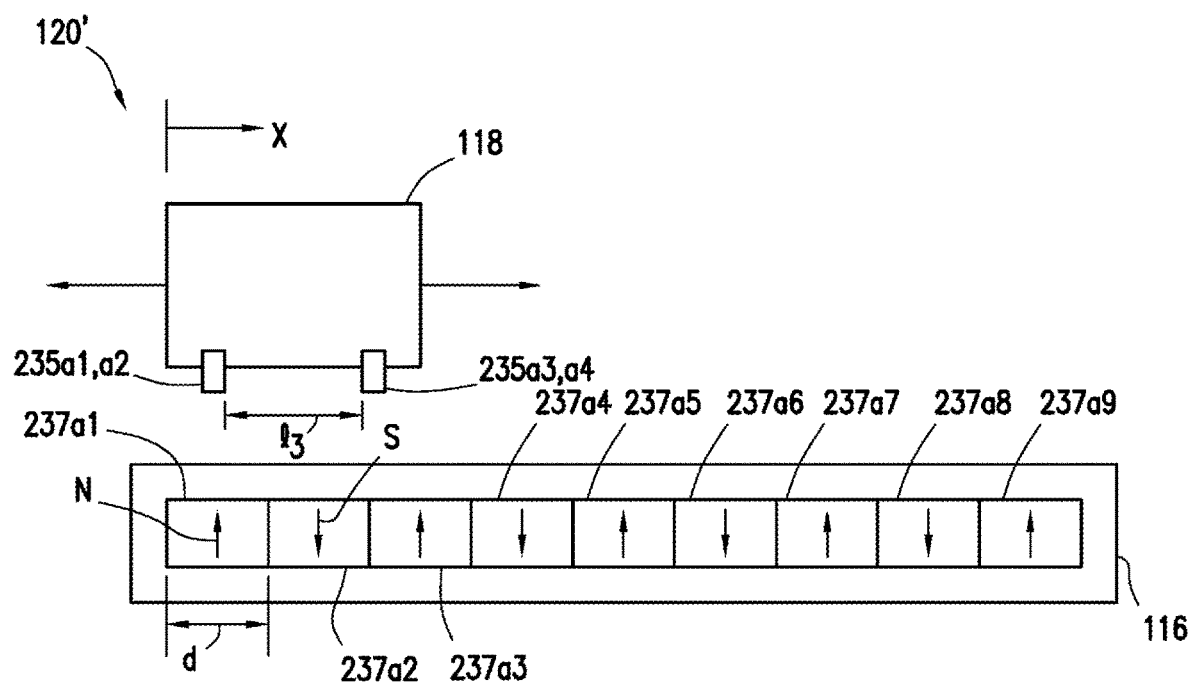
FIGS. 6C-6D are a schematic view and graphs depicting operation of a cutter block with multiple pairs of position sensors positionable about references in a tool body.
Figure 6D:
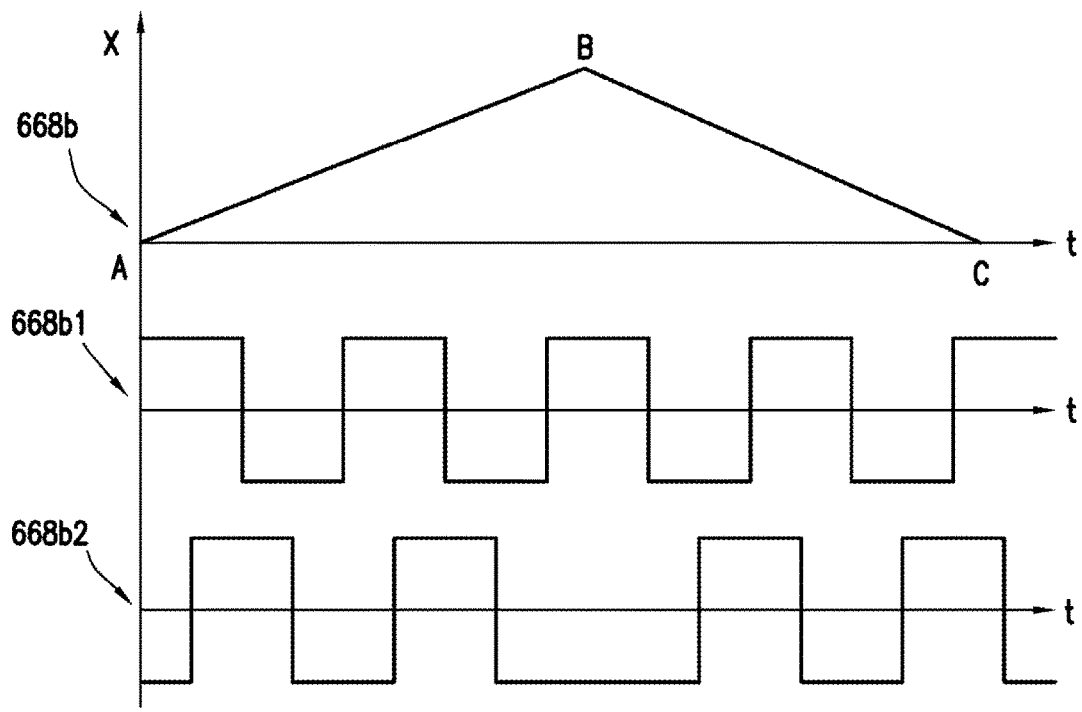

FIGS. 6C-6D depict operation of another sensor assembly 120' and measurement generated thereby. The sensor assembly 120' is similar to the sensor assembly 120 of FIGS. 6A-6B, except that the sensor assembly 120' is provided with multiple pairs of position sensors 235a1,a2 and 235a3, a4 positioned in the cutter block 118, and multiple references 237a1-a9 positioned in the drilling assembly 116. Line 668b shows the position of the cutter block 118 as it moves back and forth about the drilling assembly 116. The line 668b begins in a retracted position at point A, peaks at the extended position at point B, and returns to the retracted position at point C.

Each of the pairs of position sensors 235a1,a2 and 235a3, a4 are spaced apart within the cutter block 118. The pair of position sensors 235a1,a2 have polarity N,S, respectively. The pair of position sensors 235a3,a4 have polarity N,S, respectively. As shown in FIG. 6C, the pairs of position sensors 235a1,a2 are spaced a distance 13 apart from sensors 235a3,a4.

The references 237a1-a9 are positioned in series within the drilling assembly 116. As shown, the references 237a1-a9 linearly disposed along a path of travel of the cutter block 118 along the drilling assembly 116, but may be in various positions. Each of the references 237a1-a9 have a width d, and a magnetic polarity of north (N) and south (S) as indicated by the arrows.

As the cutter block 118 and the pairs of position sensors 235a1-a4 move relative to the references 237a1-a9, the position sensors 235a1, a2, a3, a4 are activated to generate a signal detectable by the electronics 234. An example signal generated by the position sensors 235a1,a2 is depicted by line 668b1 and sensors 235a3,a4 is depicted by line 668b2 in the graph of FIG. 6D. Line 668b1 depicts output by sensors 235a1,a2, and line 668b2 depicting output by sensors 235a3,a4 as the cutter block 118 moves relative to references 237a1-a9 over time t.

The lines 668b,b1,b2 refer to signals represented by the following equations:

$$1 = \frac{2nd+1}{2} n = 1, 2, 3 \ldots \quad \text{Eqn. (1)}$$

$$\Delta x = \text{n\_flips} * d/2 \quad \text{Eqn. (2)}$$

where Δx represents the x position of the cutter block, n_flips is the number of times either sensor flips from north to south, and d is the spacing of the references. Equation (1) describes the position 1 of the references, where n is a counter representing each reference. Equation (2) describes the sum of the flips from sensor 235a1 and sensor 235a2 times one half the spacing of the magnets for unidirectional motion.

Line 668b1,b2 are depicted as square waves generated by pairs 235a1,a2 and 235a3,a4, respectively, as they encounter the references 237a1-a9. The square waves peak in along the curve as an N polarity of the reference is encountered by a corresponding sensor.

Because of the spacing being offset by half the width of the reference 237a1-a9, the pairs of sensors 235a1,a2 and a3,a4 'take turns' flipping as long as the motion of the cutter block 118 is in the same direction. The signal generated by the sensors 235a1,a2 creates pulses that can be counted to determine the amount of motion in a direction, with a resolution of half (½) a width d of the reference 237a1-a9.

When reversing direction, one of the pairs of sensors 235a1,a2 and 235a3,a4 may alternate twice before the other sensor will alternate. The pairs of sensors 235a1,a2 and 235a3,a4 may then 'take turns' flipping just like when the cutter block 118 was traveling originally. By counting pulses in each direction and detecting direction changes, a location of the cutter block 118 can be known at all times. Also, a speed of motion of the cutter block 118 can be monitored part or all of the time.

Figure 6E:
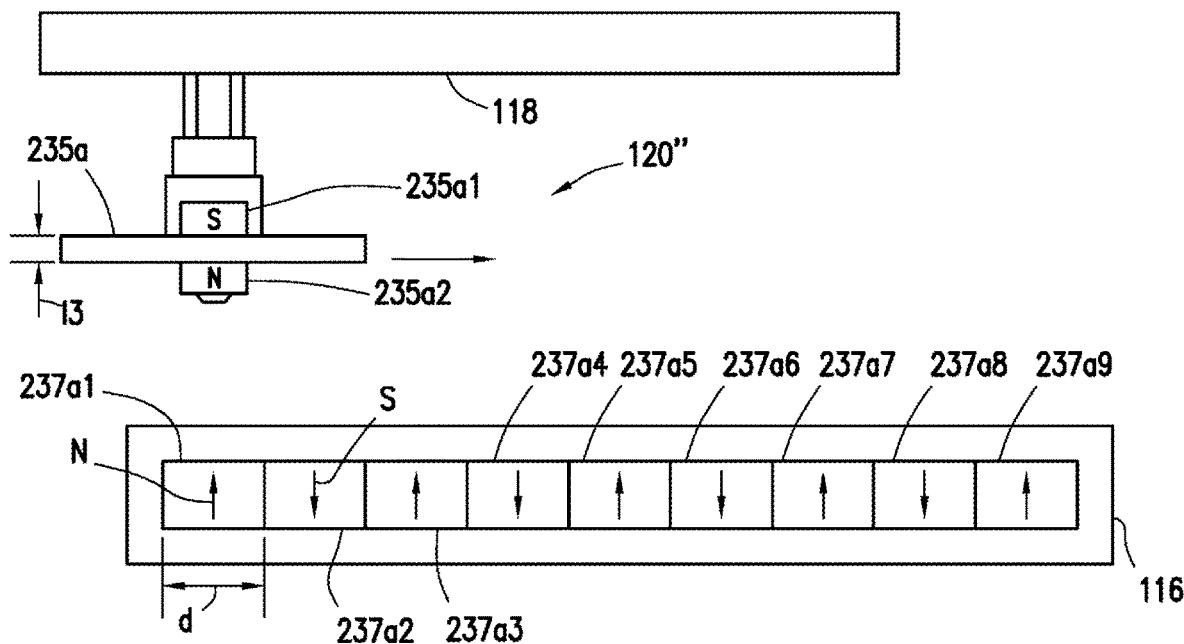
FIGS. 6E-6F are a schematic view and graphs depicting operation of another cutter block with the position sensors in a vertical configuration.
Figure 6F:
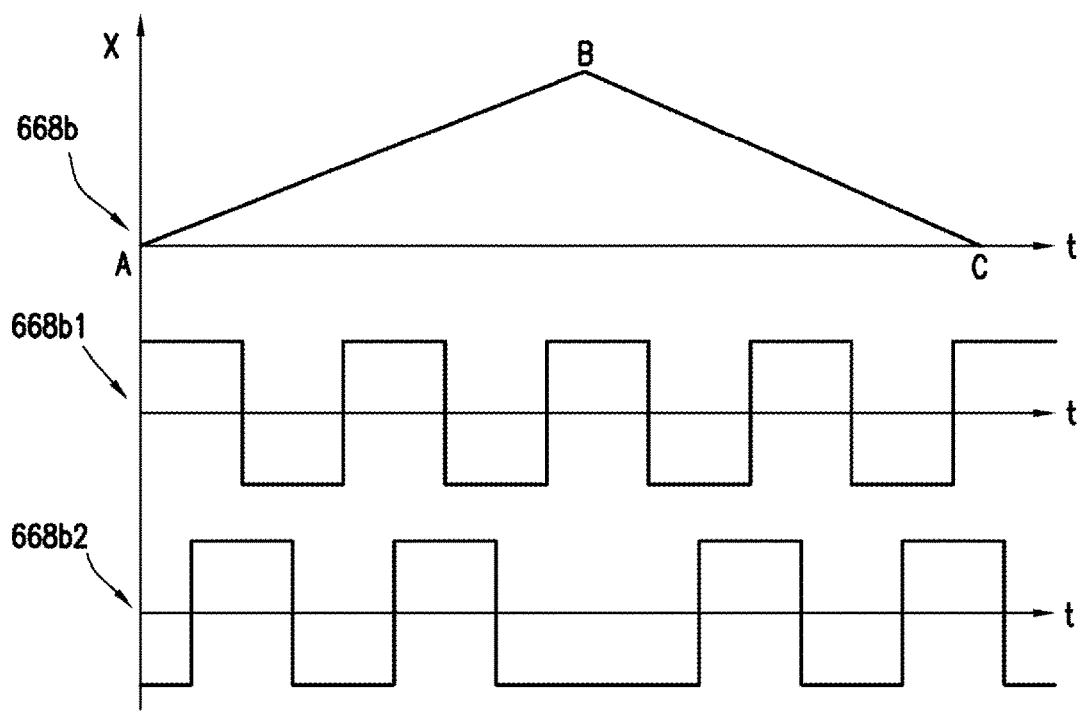

FIGS. 6E-6F depict operation of another version of the sensor assembly 120″ and measurement generated thereby. The sensor assembly 120″ is similar to the sensor assembly 120′ of FIGS. 6C-6D, except that the sensor assembly 120″ is shown as including the position sensor 235a with a north position sensors 235a1 and a south position sensor 235a2 on either side thereof. The references 237a1-a9 and the corresponding graphs 668b, b1, b2 of FIG. 6F are substantially the same as in FIGS. 6C and 6D.

In this example, the north and south position sensors 235a1,a2 are positioned on opposite sides of a disc portion of the position sensor 235a and separated by a distance 13 defined by a width of the disc portion. For example, spacing may be provided between north and south sensors to remove the possibility of seeing repeating conditions. The spacing may be, for example, smaller than the width of the magnets.

Figure 6G:
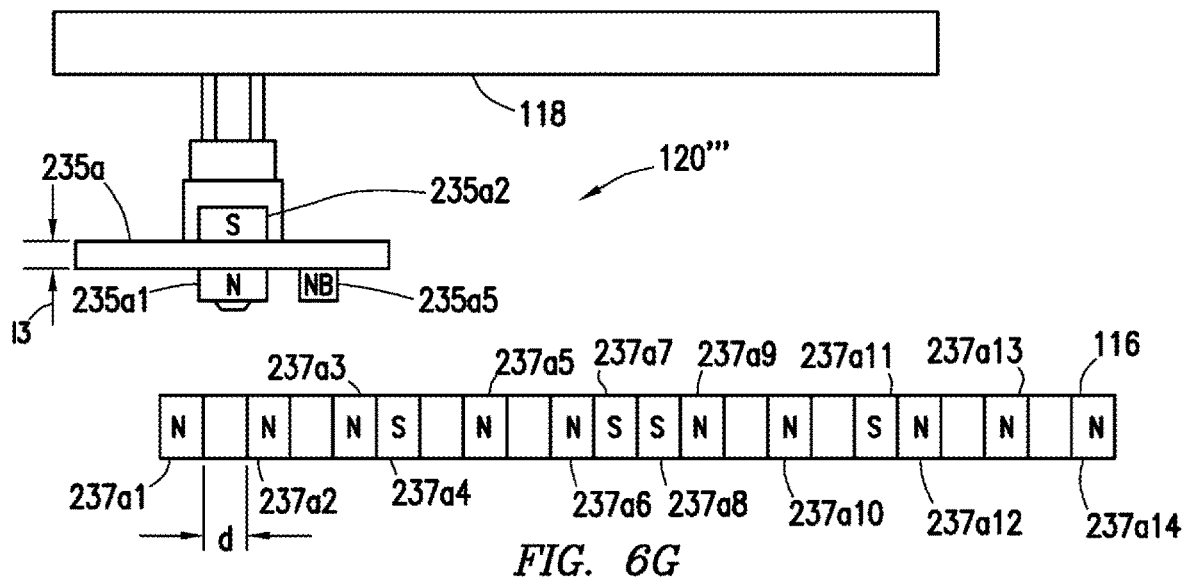
FIGS. 6G-6H are a schematic view and graphs depicting operation of the cutter block of FIG. 6E with a bi-polar sensor.
Figure 6H:
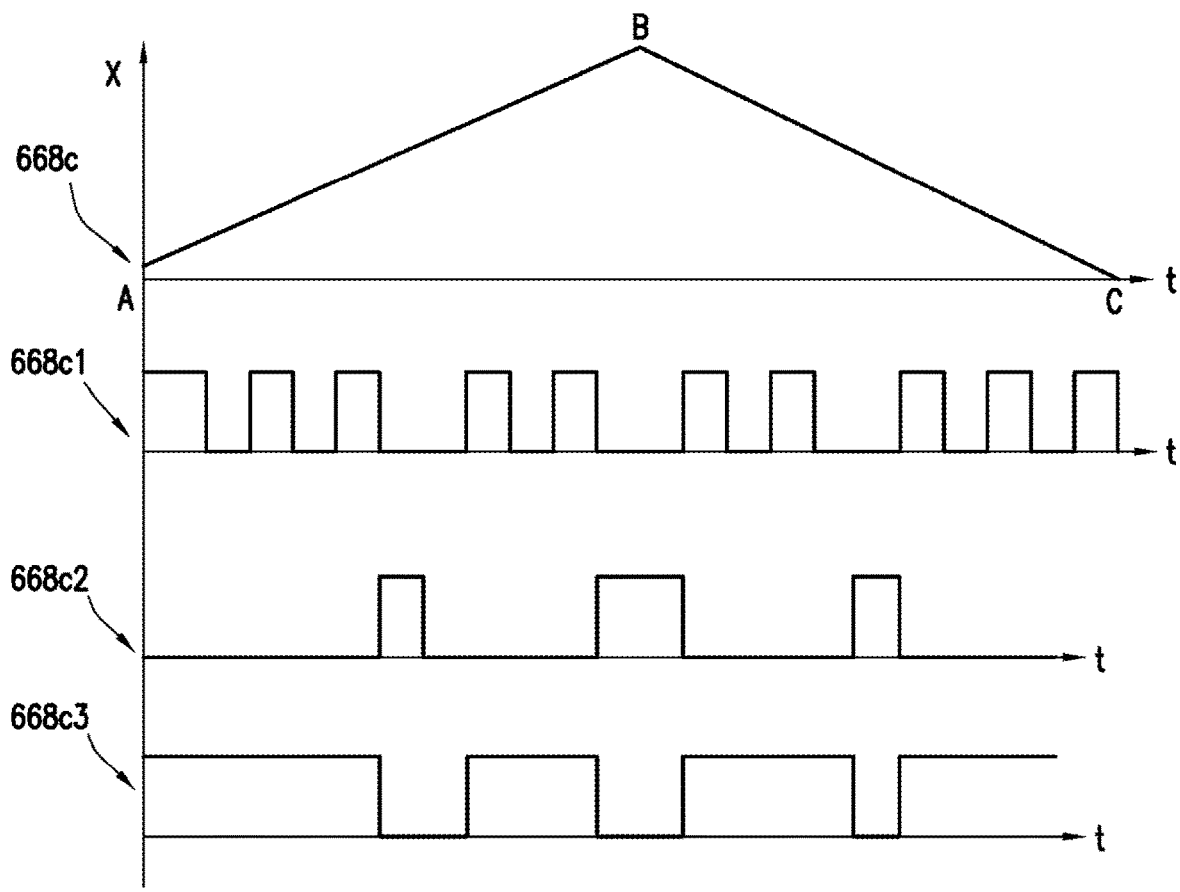

FIGS. 6G and 6H depict operation of another version of the sensor assembly 120‴. This sensor assembly 120‴ is similar to the sensor assembly 120″ of FIGS. 6G and 6H, except that an additional north bi-polar sensor 235a5 is also provided and the reference magnets 237a1-a14 are shown in a different configuration. The bi-polar sensor 235a5 is depicted as being adjacent to the north sensor 235a1, but could be at various positions. The bi-polar sensor 235a5 may be a north detecting sensor (NB) that flips logic levels upon sensing an opposite pole to detect, for example, a position that is in between a fully retracted and fully expanded position of the cutter block 118.

The movement of the sensor assembly 120‴ about the drilling assembly 116 generates the graphs 668c-c3. The reference magnets 237a1-14 are shown with north sensor magnets spaced from north sensor magnets with a distance d therebetween. The north and south sensor magnets are also shown adjacent other south sensor magnets. Similar to the graphs 668b1-b2 of FIGS. 6D and 6F, the north and south sensor magnets 235a1, a2 generate similar signals 668c1, c2 that change every time an opposing references 237a1-a14 is detected. However, the addition of the bi-polar sensor 235a5 generates a different graph 668c3 which indicates a change in the signal only when the references switch from a N to S or from an S to N polarity.

As shown by FIGS. 6A-6H, various configurations of position and references may be provided for use in the sensor assembly and/or drilling assembly. Various combinations or variations of the sensors provided herein may be used to generate various outputs for detecting position.

Figure 7A:
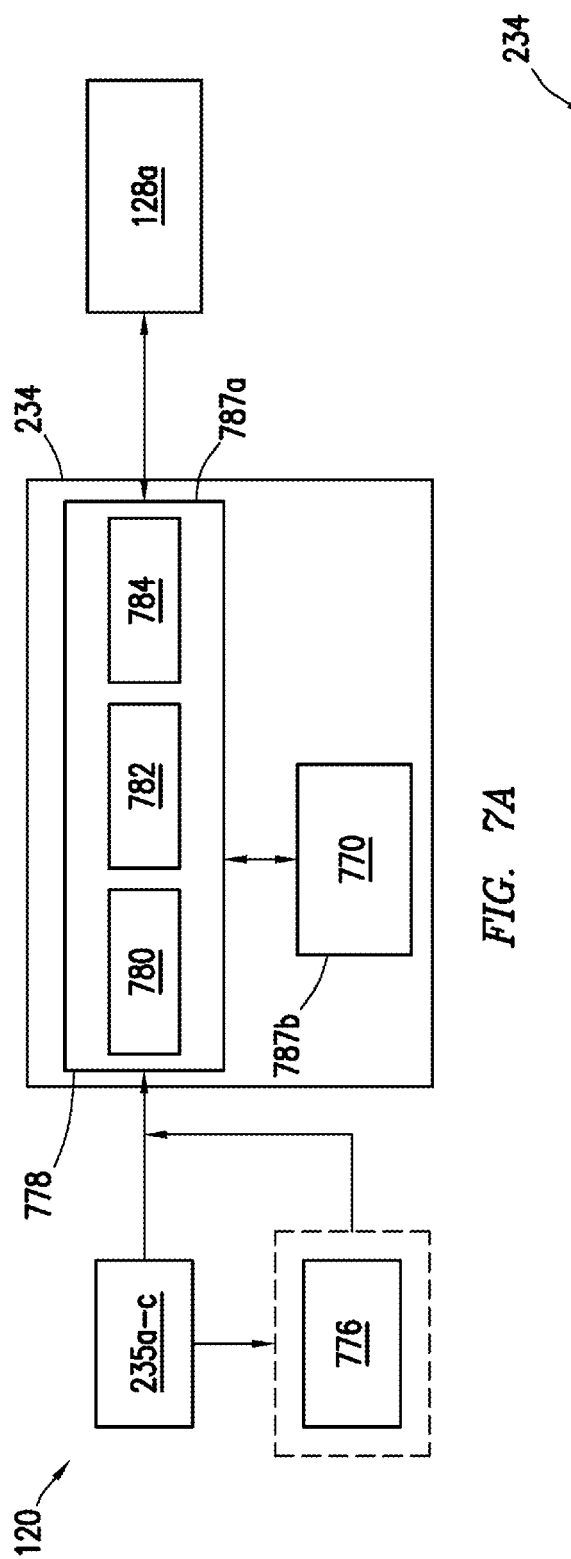
FIGS. 7A and 7B are schematic diagrams depicting electronics of the sensor assembly.
Figure 7B:
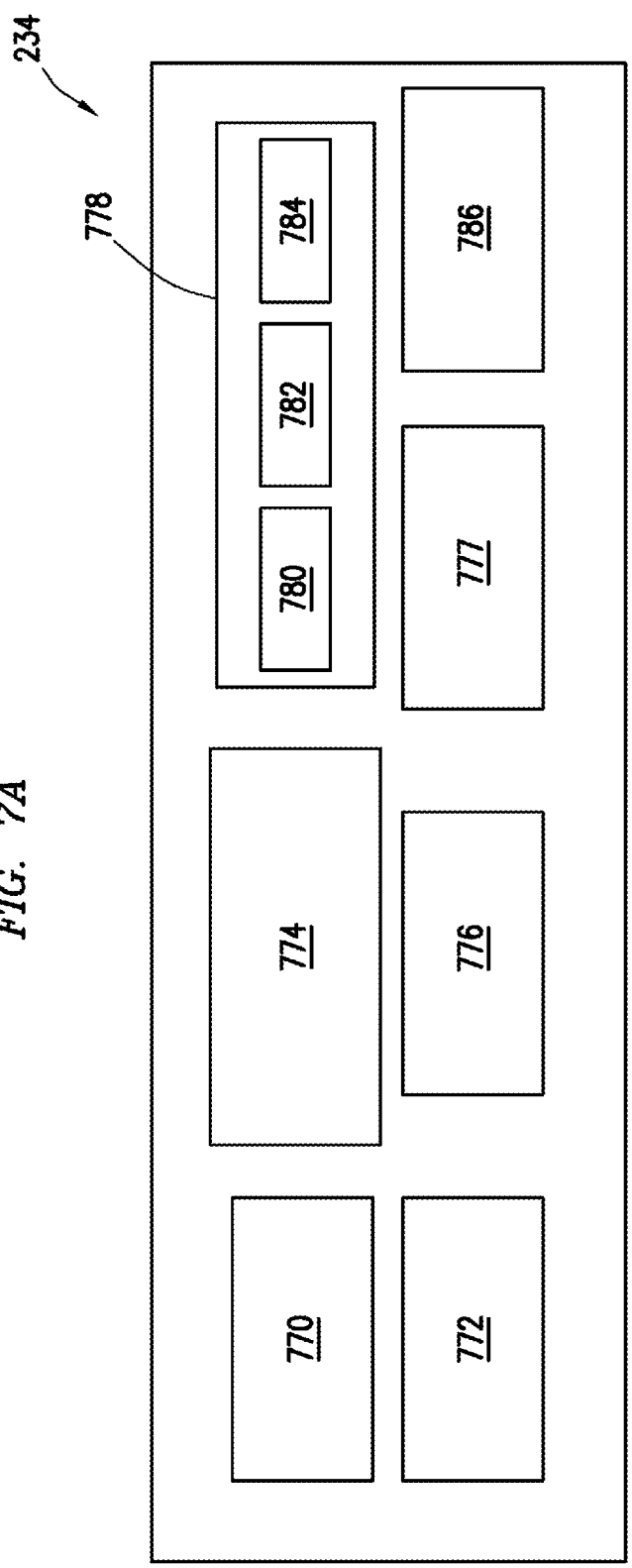

FIGS. 7A and 7B are schematic diagrams depicting example electronic configurations of the sensor assembly 120 and the electronics 234. As shown, the sensor assembly 120 includes a sensor 235a,b,c connectable to the electronics 234 and a surface unit 128a. Part or all of the electronics 234 may be positioned in various locations, such as in the movable portion (e.g., reamer) and/or the drill collar of the drilling assembly (see, e.g., FIGS. 2A,2B).

As shown, the electronics 234 may include a memory 770, communicator 772, sensors 774, ADC (analog to digital)/DAC(digital to analog) 776, power supply 777, and/or processor 778. The memory 770 may be any storage device, such as flash memory, and/or other devices. The electronics may monitor measurements of the sensor(s) 235a-c and store data in the memory 770. The memory 770 may be accessed for local processing, and/or streamed to the surface for real time feedback.

The communicator 772 maybe an antenna, signal amplifier, transceiver, or other device for providing communication between the sensor assembly 120 and other devices, such as depicted in FIGS. 1 and 2A. Data collected and/or stored in memory 770 may be downloaded later at surface for further analysis and/or streamed via various telemetry means, such as those described herein.

The sensors 774 may include various measurement devices, such as magnetometers, accelerometers, gyros, gauges, and/or other devices capable of measuring various parameters, such as temperature, pressure, position, polarity, movement, rotation, orientation, etc.

The external ADC (Analog to digital)/DAC (digital to analog) 776 maybe used to capture the signals from sensors 235a-c and send them to the electronics 234 for processing on processor 778 or recording to memory 770.

The power supply 777 may be used to condition a power source, such as a battery, power supply, and/or other device. As soon as the sensor assembly 120 is powered on, the electronics 234 may begin monitoring the sensors 235a-c and record the data to memory 770 for analysis. In order to preserve power and memory space, the drilling assembly (e.g., 116 of FIG. 1) may be shut down regularly for part of the drilling time and come back on to take measurements. Using this method, the drilling assembly may reach longer run times and still give the desired data about the performance of the reamer.

The processor 778 may be one or more devices capable of processing signals and/or data. For example, the processor 778 may include an ADC (analog to digital)/DAC (digital to analog)/GIO 780, microcontroller (μC)/DSP (digital signal processing)/FPGA (field programmable gate array) 782, UART (universal asynchronous receiver, transmitter) 784, and/or other electrical devices. Part or all of the items in the processor 778, such as the ADC/DAC/GIO 780 and microcontroller/FPGA 782 may be in the communicator 772. For example, the processor may be a microcontroller and/or similar processor that handles all the processes, such as measurement logging, writing to flash memory and/or streaming to surface.

The electronics 234 may include other options, such as real time clock (counter) 786. Part or all of the electronics, such as the real time clock 786, may run on a separate power source, or other means to keep track of time if a reset were to happen downhole. One or more of the devices may be provided on one or more electrical boards, such as the two boards 787a,b as depicted in FIG. 7A.

The electronics 234 may include other features, such as those depicted herein. In an example, the microcontroller 782 may use an interrupt to operate in a low-power state while tracking position with the position sensors herein. The microcontroller 782 may also be used to measure voltage levels of the various sensors using a general input to the microcontroller or an internal/external signal converter (e.g., ADC 580 of FIG. 5E). The various sensors (e.g., 235a-c or 535c) can be wired via the signal converter (e.g., multiplexer 580 of FIG. 5E) to sample sequentially and reduce the number of wires used with wear sensor 535c (or other sensors).

Figure 8:
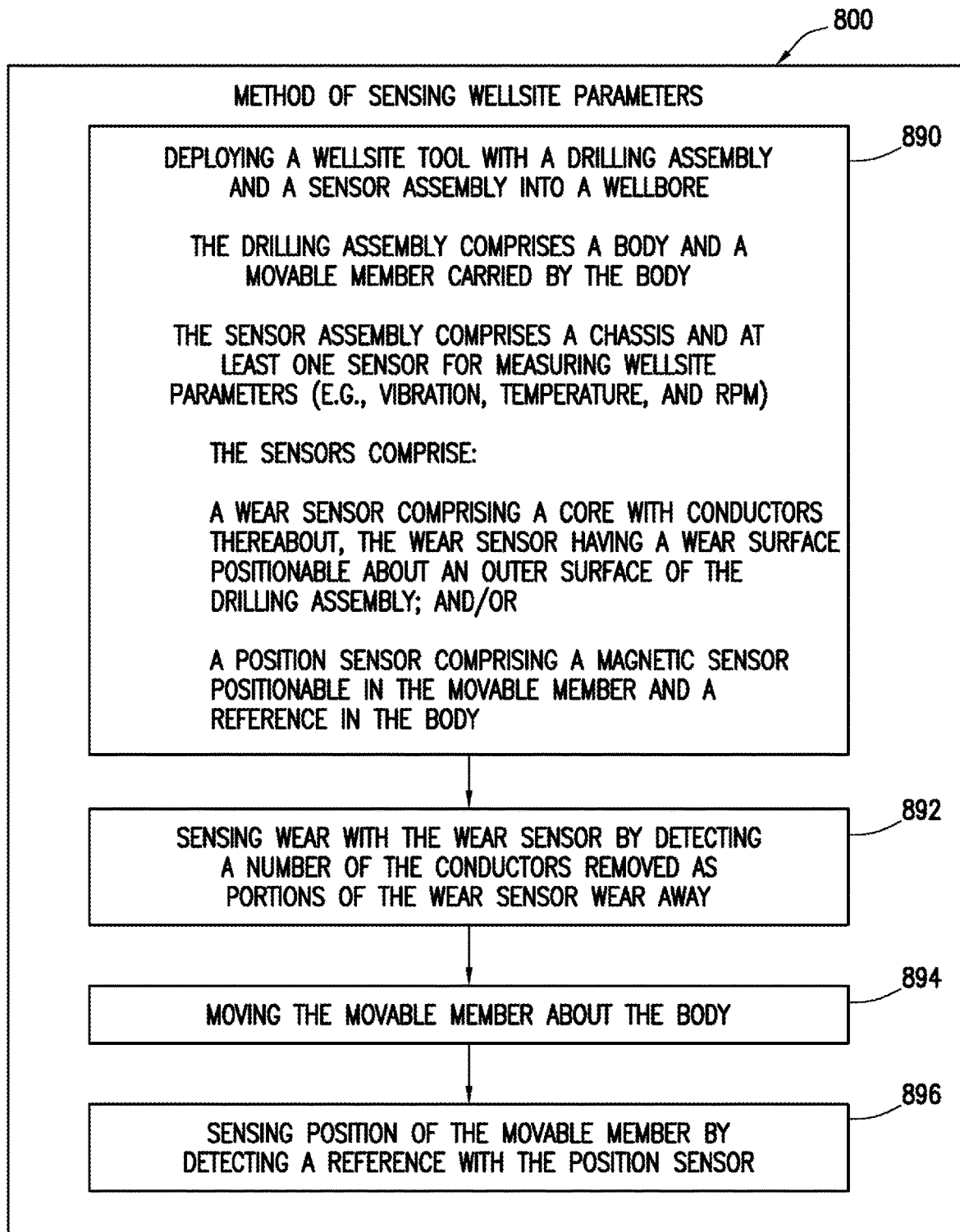
FIG. 8 is a flow chart depicting a method of sensing well site parameters.

FIG. 8 depicts a method 800 of sensing wellsite parameters. The method 800 involves 890—deploying a well site tool with a drilling assembly and a sensor assembly into a wellbore. The drilling assembly comprises a body (e.g., drill collar) and a movable member. The sensor assembly includes a chassis and at least one sensor for measuring wellsite parameters (e.g. vibration, temperature, revolutions per minute, etc.) as described herein.

The sensors comprise a wear sensor and a position sensor. The wear sensor comprises a core with conductors thereabout, and a wear surface positionable about an outer surface of the drilling assembly. The position sensor comprises a magnetic sensor positionable in the movable member and a reference in the body.

The method also involves 892—sensing wear with the wear sensor by detecting a number of the conductors removed as portions of the wear sensor wear away, 894—moving the movable member about the body, and 896—sensing position of the movable member with the position sensor by detecting a reference with the position sensor.

Other portions of the method may be performed, such as measuring processing data collected by the sensor(s) and/or communicating the data about the wellsite. The method(s) may be performed in any order and repeated as desired.

It will be appreciated by those skilled in the art that the techniques disclosed herein can be implemented for automated/autonomous applications via software configured with algorithms to perform the desired functions. These aspects can be implemented by programming one or more suitable general-purpose computers having appropriate hardware. The programming may be accomplished through the use of one or more program storage devices readable by the processor(s) and encoding one or more programs of instructions executable by the computer for performing the operations described herein. The program storage device may take the form of, e.g., one or more floppy disks; a CD ROM or other optical disk; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Aspects of the invention may also be configured to perform the described functions (via appropriate hardware/software) solely on site and/or remotely controlled via an extended communication (e.g., wireless, internet, satellite, etc.) network.

While the embodiments are described with reference to various implementations and exploitations, it will be understood that these embodiments are illustrative and that the scope of the inventive subject matter is not limited to them. Many variations, modifications, additions and improvements are possible. For example, various combinations of one or more of the features herein may be provided about one or more movable or non-movable components of a well site tool to sense and/or determine one or more well site parameters.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

Insofar as the description above and the accompanying drawings disclose any additional subject matter that is not within the scope of the claim(s) herein, the inventions are not dedicated to the public and the right to file one or more applications to claim such additional invention is reserved. Although a very narrow claim may be presented herein, it should be recognized the scope of this invention is much broader than presented by the claim(s). Broader claims may be submitted in an application that claims the benefit of priority from this application.

The invention claimed is:

1. A wear sensor, comprising:
   a base;
   a plurality of conductive layers stacked on the base, the plurality of conductive layers defining a wear surface; and
   a plurality of vias extending through each one of the plurality of conductive layers and to the base,
   wherein the plurality of vias is electrically connected to electronics to generate a signal through the plurality of vias whereby, upon wear of each of the plurality of conductive layers, a change in the signal of a corresponding via of the plurality of vias at a depth of the wear is detectable.

2. The wear sensor of claim 1, wherein each of the plurality of conductive layers is electrically connected to at least two of the plurality of vias, the at least two of the plurality of vias connected electrically in parallel to one another.

3. The wear sensor of claim 1, wherein the plurality of vias comprise base vias and conductor vias, each of the base vias and each of the conductor vias in electrical communication with a corresponding one of the plurality of conductive layers, the conductor vias in electrical communication with the base vias through the corresponding one of the plurality of conductive layers, the base vias electrically connected to the electronics to generate a signal through the plurality of vias.

4. The wear sensor of claim 1, wherein the plurality of vias are tubular members extending vertically through the plurality of conductive layers from the wear surface to the base, the plurality of vias positioned parallel to each other.

5. The wear sensor of claim 1, wherein the plurality of vias comprise conductor vias, and wherein each of the conductor vias comprises a conductor portion electrically coupled to a corresponding one of the plurality of conductive layers and an insulated portion electrically insulated from a remaining portion of the plurality of conductive layers.

6. A wear sensor, comprising:
   a base positionable about a surface;
   a plurality of conductive layers stacked on the base, the plurality of conductive layers defining a wear surface; and
   a plurality of vias extending through each one of the plurality of conductive layers and to the base;
   wherein each of the plurality of conductive layers is electrically connected to at least two of the plurality of vias, the at least two of the plurality of vias connected electrically in parallel to one another;
   wherein the plurality of vias is electrically connected to electronics to generate a signal through the plurality of vias whereby, upon wear of each of the plurality of conductive layers, a change in the signal of a corresponding one of the at least two of the plurality of vias at a depth of the wear is detectable.

7. The wear sensor of claim 6, wherein the plurality of vias comprise base vias.

8. The wear sensor of claim 7, wherein the base vias are in electrical communication with the base.

9. The wear sensor of claim 7, wherein the base vias comprise a conductor extending therethrough, the conductor electrically coupled to a corresponding one of the plurality of conductive layers and to the base.

10. The wear sensor of claim 6, wherein the plurality of vias comprise conductor vias.

11. The wear sensor of claim 10, wherein the conductor vias are distributed about each of the plurality of conductive layers.

12. The wear sensor of claim 10, wherein the conductor vias comprise ten conductor vias extending along a length of the plurality of conductive layers.

13. The wear sensor of claim 10, wherein each of the conductor vias comprises a conductor portion electrically coupled to a corresponding one of the plurality of conductive layers and an insulated portion electrically insulated from a remaining portion of the plurality of conductive layers.

14. The wear sensor of claim 6, wherein the plurality of vias comprise base vias and conductor vias, each of the base vias and each of the conductor vias in electrical communication with a corresponding one of the plurality of conductive layers, the conductor vias in electrical communication with the base vias through the corresponding one of the plurality of conductive layers, the base vias electrically connected to the electronics to generate a signal through the plurality of vias.

15. The wear sensor of claim 6, wherein the plurality of vias are tubular members extending vertically through the plurality of conductive layers from the wear surface to the base, the plurality of vias positioned parallel to each other.

16. The wear sensor of claim 6, wherein the plurality of conductive layers comprise copper.

17. A wear sensor, comprising:
    a base positionable about a surface;
    a plurality of conductive layers stacked on the base, the plurality of conductive layers defining a wear surface; and
    a plurality of vias extending through the plurality of conductive layers and to the base,
    wherein the plurality of vias is electrically connected to electronics to generate a signal through the plurality of vias whereby, upon wear of each of the plurality of conductive layers, a change in the signal of a corresponding via of the plurality of vias at a depth of the wear is detectable,
    wherein the plurality of vias comprise base vias and conductor vias, each of the base vias and each of the conductor vias in electrical communication with a corresponding one of the plurality of conductive layers, the conductor vias in electrical communication with the base vias through the corresponding one of the plurality of conductive layers, the base vias electrically connected to the electronics to generate a signal through the plurality of vias.

18. The wear sensor of claim 17, wherein the plurality of vias are tubular members extending vertically through the plurality of conductive layers from the wear surface to the base, the plurality of vias positioned parallel to each other.

19. The wear sensor of claim 17, wherein each of the plurality of conductive layers is electrically connected to at least two of the plurality of vias, the at least two of the plurality of vias connected electrically in parallel to one another.

20. The wear sensor of claim 17, wherein the conductor vias comprise ten conductor vias extending along a length of the plurality of conductive layers.

* * * * *